(12) United States Patent
Shapiro

(10) Patent No.: US 7,356,575 B1
(45) Date of Patent: *Apr. 8, 2008

(54) SYSTEM, METHOD, AND COMPUTER PROGRAM PRODUCT FOR REMOTELY DETERMINING THE CONFIGURATION OF A MULTI-MEDIA CONTENT USER

(75) Inventor: Jody Shapiro, San Jose, CA (US)

(73) Assignee: Sony Corporation, Tokyo (JP)

( * ) Notice: Subject to any disclaimer, the term of this patent is extended or adjusted under 35 U.S.C. 154(b) by 499 days.

This patent is subject to a terminal disclaimer.

(21) Appl. No.: 10/700,409

(22) Filed: Nov. 3, 2003

Related U.S. Application Data

(63) Continuation-in-part of application No. 09/986,683, filed on Nov. 9, 2001.

(60) Provisional application No. 60/516,017, filed on Oct. 31, 2003.

(51) Int. Cl.
*G06F 13/00* (2006.01)

(52) U.S. Cl. ..................................... 709/220

(58) Field of Classification Search .................. None
See application file for complete search history.

(56) References Cited

U.S. PATENT DOCUMENTS

| | | | |
|---|---|---|---|
| 3,394,352 A | 7/1968 | Wernikoff et al. |
| 3,913,093 A | 10/1975 | De Vincentiis et al. |
| 5,526,397 A | 6/1996 | Lohman |
| 5,657,015 A | 8/1997 | Nakajima et al. |
| 5,796,829 A | 8/1998 | Newby et al. |
| 5,818,537 A | 10/1998 | Enokida et al. |
| 5,818,933 A | 10/1998 | Kambe et al. |
| 5,838,927 A | 11/1998 | Gillon et al. |
| 5,848,134 A | 12/1998 | Sekiguchi et al. |
| 5,949,876 A | 9/1999 | Ginter et al. |
| 5,991,795 A | 11/1999 | Howard et al. |
| 6,122,290 A | 9/2000 | Kawamata |

(Continued)

FOREIGN PATENT DOCUMENTS

EP 0 727 888 8/1996

(Continued)

OTHER PUBLICATIONS

Rakesh Mohan et al., Content Adaptation Framework: Bringing the Internet to Information Appliances (IBM), Multimedia Services and Technology Issues, Global Telecommunications Conference—Globecom '99, pp. 2015-2021.

(Continued)

*Primary Examiner*—Robert B Harrell
(74) *Attorney, Agent, or Firm*—Frommer Lawrence & Haug LLP; William S. Frommer; Thomas F. Presson

(57) ABSTRACT

A method for remotely determining the configuration of a computer of a multimedia content user includes sending player detection code to the user's computer and receiving configuration information regarding the user's computer. A method of determining a connection speed of a computer includes determining a size of a timing block based on an estimated bandwidth and retrieving the timing block. The connection speed is determined based on the timing block size and the times at which transfer begins and ends.

18 Claims, 17 Drawing Sheets

U.S. PATENT DOCUMENTS

| | | | |
|---|---|---|---|
| 6,247,050 B1 | 6/2001 | Tso et al. | |
| 6,594,699 B1* | 7/2003 | Sahai et al. | 709/228 |

FOREIGN PATENT DOCUMENTS

| | | |
|---|---|---|
| EP | 0 992 922 | 4/2000 |
| EP | 1 026 872 | 8/2000 |
| EP | 1 032 217 | 8/2000 |
| EP | 1 043 655 | 10/2000 |
| WO | WO 00 72517 | 11/2000 |

OTHER PUBLICATIONS

Richard Han et al., Dynamic Adaptation in an Image Transcoding Proxy for Mobile Web Browsing (IBM), IEEE Personal Communications, Dec. 1998, pp. 8-17.

"Broadcast Help," [retrieved Aug. 20, 2002] at http://help.yahoo.com/help/us/bcst/, 2 pages.

"BrowserHawk features and benefits," [retrieved Jan. 23, 2004] at http://www.cyscape.com/products/bhawk/features.asp, 6 pages.

"Yahoo! Broadcast," [retrieved Aug. 20, 2002] at http://broadcast.yahoo.com/home.html, 3 pages.

"Larry Bouthillier's Streaming Media Player Detection Tutorial—Client-side code," [retrieved Sep. 20, 2002] at http://www.emediacommunications.biz/sm5/sm5_clientcode.html, 4 pages.

"Streaming Media Player/Connection Speed Detection Tutorial," [retrieved Sep. 20, 2002] at http://www.emediacommunications.biz/sm5/index.html, 2 pages.

A flowchart, [retrieved Sep. 20, 2002] at http://www.emediacommunications.biz/sm5/playDetectFlow.gif, 1 page.

A flowchart, [retrieved Sep. 20, 2002] at http://www.emediacommunications.biz/sm5/playerDataObjectUML.gif, 1 page.

Youn J et al: "Video Transcoding for Multiple Clients" Proceedings of the SPIE, SPIE, Bellingham, VA, US, vol. 4067, No. PART 1-3, Jun. 2000, pp. 76-85, XP008012075 ISSN: 0277-786X.

Smith J R et al: "Content-based transcoding of images in the Internet" Image Processing. 1998 ICIP 98. Proceedings. 1998 International Conference on Chicago, IL, USA Oct. 4-7, 1998, Los Alamitos, CA, USA,IEEE Comput. Soc, US, vol. 3, Oct. 4, 1998, pp. 7-11, XP010586855 ISBN: 0-8186-8821-1.

* cited by examiner

2 Flow Charts

| PUBLISHING VARIABLES | SOURCE TYPE 710 | DESTINATION TYPE 750 | DESTINATION TYPE 760 |
|---|---|---|---|
| PHYSICAL MEDIUM | LOCAL DISK | INTERNET | WIRELESS NETWORK |
| COMMUNICATION PROTOCOL | FILE I/O | WINDOWS MEDIA STREAMING MMS PROTOCOL | HTTP |
| CONTAINER FORMAT | MP3 | WINDOWS MEDIA | MP3 |
| ENCODING BIT RATE | 128 kpbs | 56 kbps | 12 kbps |

FIG. 8

| CLIENT ENVIRONMENT VARIABLES | SOURCE TYPE 810 | DESTINATION TYPE 850 |
|---|---|---|
| OS VERSION | WINDOWS XP | MAC OS X |
| WEB BROWSER VERSION | NAVIGATOR 3.0 | OMNIWEB 4.1 |
| HARDWARE PLATFORM | PENTIUM 4 | G3 |
| USER INTERFACE LANGUAGE | JAVASCRIPT FOR NAVIGATOR 3.0 | XSLT FOR OMNIWEB 4.1 |

FIG. 9

SYSTEM, METHOD, AND COMPUTER PROGRAM PRODUCT FOR REMOTELY DETERMINING THE CONFIGURATION OF A MULTI-MEDIA CONTENT USER

PRIORITY

This application is a continuation-in-part of U.S. patent application Ser. No. 09/986,683, filed Nov. 9, 2001, published May 15, 2003 as U.S. published application No. 2003/0093507, which is hereby incorporated by reference; and this application claims priority to U.S. provisional application Ser. No. 60/516,017, filed Oct. 31, 2003, by inventor Jody Shapiro, entitled "System, Method, and Computer Program Product for Remotely Determining the Configuration of a Multi-Media Content User".

BACKGROUND OF THE INVENTION

1. Field of the Invention

The invention described herein relates to information systems, and more particularly to detection of multimedia content client configuration information.

2. Related Art

Given the availability of data networks and the availability of high-speed data connections, it is now commonplace for end users to access multi-media content. A number of web sites now offer audio and video to users. Ideally, the user simply clicks on a link or control presented in a web page, and one or more multi-media files are delivered. If the user has the appropriate hardware and software configuration, the file can then be played.

There are currently a significant variety of user configurations, however. Some users have INTEL based personal computers (PCs), while others may have APPLE MACINTOSH computers. Different operating systems are also present. Some users will have a version MICROSOFT WINDOWS, from MICROSOFT, Inc., while others have a version of MAC OS, from APPLE, Inc. Moreover, each of these operating systems now has several versions in the user community. In addition, a number of software programs are now available to play multimedia on the computers of users. These players include QUICKTIME™ (from APPLE, Inc.), REALPLAYER™ (from REALNETWORKS, Inc.), and WINDOWS MEDIAPLAYER™ (from MICROSOFT, Inc.). Moreover, each of these players has several versions that are currently available in the user community. Finally, different users may be operating at different data rates. Some users may have a high speed broadband connection, while others may have a 56K modem connection.

Given this variety of platforms, operating systems, players, and data rates, a content provider is faced with the problem of how to format the content to be delivered. Incorrect formatting would result in the delivery of content that was incompatible with a user's configuration. This could result in content that is unusable. If the content is usable, the content may be in a format that fails to take advantage of all the features available in the user's configuration, such that the content, as experienced by the user, is not as rich as it could be.

In the past, content providers have addressed this problem by choosing some set of common user configurations. The provider, for example, might identify the most common media players and versions thereof. The provider formats the content for each of these players and stores these assorted versions of the content. The provider would then develop a menu to be provided to the user, in effect asking which media player the user has, or, if the user has more than one, which player is preferred by the user. The user then makes a selection, and the content that has been pre-encoded in the selected format is delivered to the user.

This solution has limitations. First, it is relatively inflexible. The number of options is limited. A user's specific configuration may not have been presented as an option in the menu. And if an end user has more than one media player available to him, the user's preferred choice may not have been listed as an option. Also, the solution above requires user input each time. The user might not want to be queried. The user may instead prefer that formatting be resolved for him. In other situations, the user might not know the information requested by the menu. The user may not know what version of a media player he has. This solution also requires that a content provider change their menus and re-encode content whenever new players (or new versions of existing players) become prevalent. The above solution, therefore, is inflexible and burdensome to both the user and the provider.

What is needed, therefore, is a way to determine a user's configuration so as to provide the user with content in a compatible format that leads to the optimal viewing experience. In addition, determination of the configuration should be made in a manner that minimizes the need for user input and is otherwise user-friendly. Moreover, an efficient way to determine the connection speed of a user is desired.

SUMMARY OF THE INVENTION

A method is provided for remotely determining the configuration of a computer of a multimedia content user. The method includes sending player detection code to the user's computer. Configuration information is received regarding the user's computer including information regarding OS version, web browser version, hardware platform, user interface language type, encoding format, or compression algorithm, or combinations thereof. The method may include setting a cookie at the user's computer to a domain of a delivery management server, performed before the receiving, and wherein the configuration information is received in the cookie.

A method for remotely determining the configuration of a computer of a multimedia content user is further provided including sending player detection code to the user's computer, receiving configuration information regarding the user's computer, and sending a modified information header instruction.

The method may also include sending unique client ID. The instructions may be received after the information is sent, and the modified information may include some information that was not included in the sent information and/or the modified information may exclude some information that was included in the sent information. The modified information header instruction may also be sent prior to the receiving, and the configuration information received may be prepared according to the modified information header instruction.

The received configuration information may include one or more adaptations such as a hardware adaptation and/or a user interface version adaptation. The modified header information instruction may be prepared according to the adaptation information.

A method is further provided for remotely determining the configuration of a computer of a multimedia content user including receiving at a user's computer player detection code from a second computer, sending to the second computer configuration information regarding the user's computer, and receiving a modified information header instruction.

An unique client ID may be received. A client ID pointer address may be appended with configuration information for sending to the second computer. Modified header information may be prepared based on the received header instruction. The modified header information with appended client ID may be sent to the second computer. A further configuration information request may be received prior to the sending of the modified header information. The instruction may be received after the configuration information is sent. The modified information may include some information that was not included in the sent information and/or may exclude some information that was included in the sent information. The instruction may also be received before the configuration information is sent. The configuration information sent may be prepared according to the modified information header instruction. The configuration information may include one or more adaptations such as a hardware adaptation and/or a user interface version adaptation, and the modified header information instruction may be prepared according to the adaptation information.

A method is also provided for determining a connection speed of a computer including determining a size of a timing block based on an estimated bandwidth, marking the time at which transfer of the timing block begins, marking the time at which transfer of the timing block ends, and determining the connection speed based on the determined timing block size and the times at which transfer begins and ends.

A further method that is provided for determining a connection speed of a computer includes receiving a timing block of data having a known size, receiving a start time at which transfer of the timing block is to begin, beginning the timing block transfer at the start time, marking the time at which transfer of the timing block ends, and determining the connection speed based on the timing block size and the times at which transfer begins and ends.

In each case, the timing block size may be determined by fetching estimated bandwidth information, determining an estimated time to retrieve data for determining connection speed with adequate resolution, and determining the timing block size that will take the determined estimated time to retrieve. The timing block may be received in a markup language comment as part of a preferences page. The method may also include storing the connection speed in a cookie. The method may include sending the cookie to a delivery management server. The timing block may comprise random data.

According to a further aspect of the invention, a method for remotely determining the configuration of a computer of a multimedia content user is provided. This method includes sending player detection code to the user's computer, receiving configuration information regarding the user's computer, and determining a type of digital rights management information on the user's computer based on the received configuration information.

One or more processor readable storage devices are also provided having processor readable code embodied thereon. The processor readable code is for programming one or more processors to perform a method for remotely determining the configuration of a computer of a multimedia content user and/or for determining a connection speed of a computer, in accordance with any of the above.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

In the drawings:

FIG. 8 is a table showing exemplary transcoding source types and destination types for various publishing variables according to an embodiment of the present invention.

FIG. 9 is a table showing exemplary client environment variable types according to an embodiment of the invention.

Preferred embodiments of the present invention will now be described with reference to the accompanying drawings. In the drawings, like reference numbers indicate identical or functionally similar elements.

INCORPORATION BY REFERENCE

Figure 1:
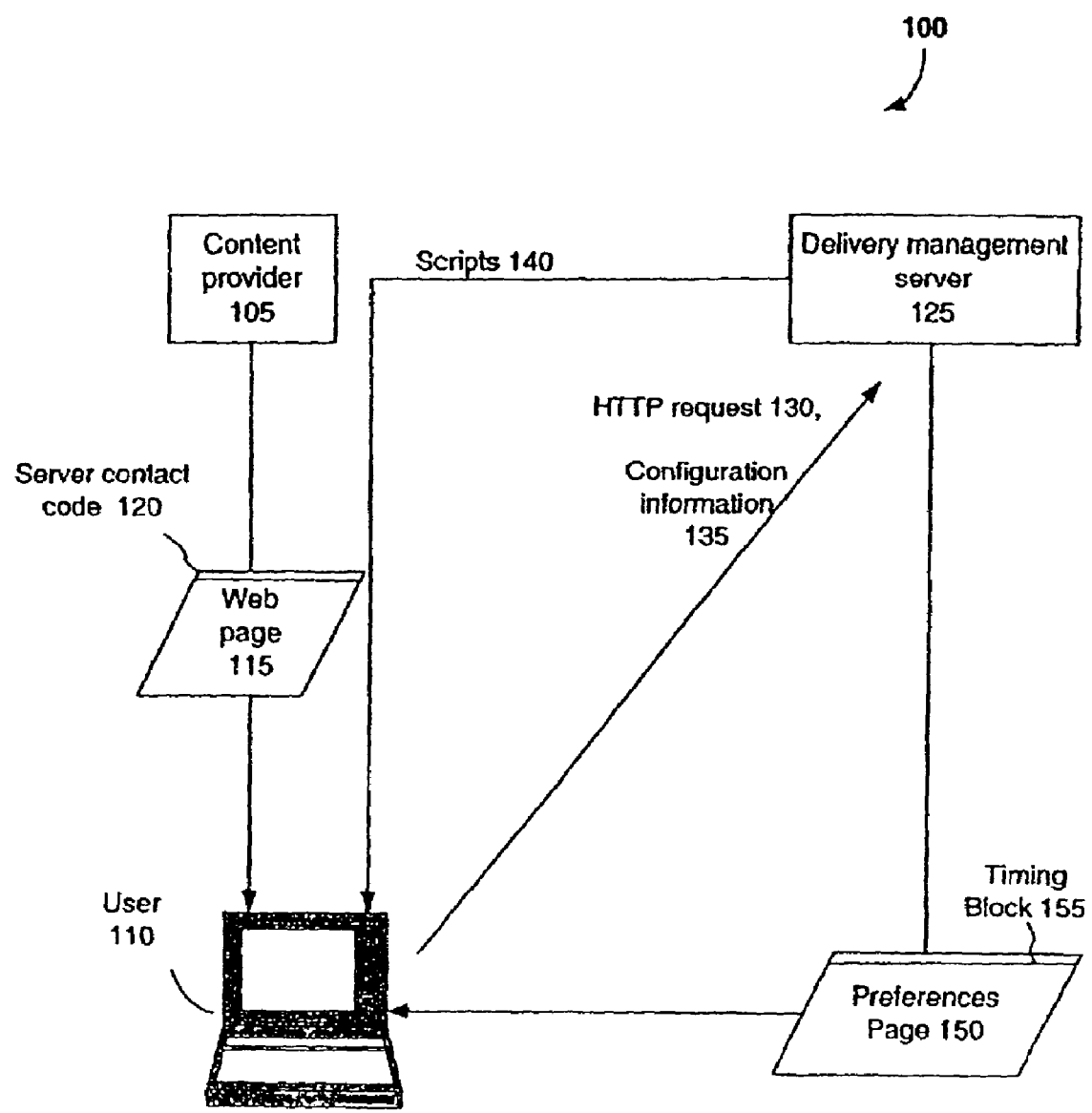
FIG. 1 illustrates the general architecture of an embodiment of the invention.

What follows is a cite list of references each of which is, in addition to that which is described as background of the invention, the abstract and the invention summary, hereby incorporated by reference into the detailed description of the preferred embodiments below, as disclosing alternative embodiments of elements or features of the preferred embodiments not otherwise set forth in detail below. A single one or a combination of two or more of these references may be consulted to obtain a variation of the preferred embodiments described in the detailed description herein:

U.S. Pat. No. 3,394,352, issued July, 1968; 3,937,881, issued February, 1976; 5,657,015, issued August, 1997; 6,593,860, issued Jul. 15, 2003; 6,407,680, issued June, 2002; 6,466,939, issued Oct. 15, 2002; 5,928,330, issued Jul. 27, 1999; 6,317,134, issued Nov. 13, 2001; and 6,070,002, issued May 30, 2000; and U.S. published applications No. 2003/0158913, published Aug. 21, 2003, 2003/0093507, published May 15, 2003, 2002/0099858, published Jul. 25, 2002, 2002/0099770, published Jul. 25, 2002, and 2002/0091800, published Jul. 11, 2002; and U.S. patent application Ser. No. 10/644,602, filed Aug. 20, 2003; and Chapman, Nigel et al., "Digital Multimedia," John Wiley & Sons, Ltd., Copyright 2000; and Murray, James D. et al., "Encyclopedia of Graphics File Formats: Second Edition," O'Reilly & Associates, Inc., Copyright 1994, 1996.

DETAILED DESCRIPTION OF THE PREFERRED EMBODIMENTS

Overview of Preferred Embodiments

A system, method, and computer program product for determining the configuration of an end user's computer system. In particular, the media players and network connection speed of the user are determined. This configuration information is then received by a second computer, preferably a delivery management server. The configuration information is used to format multi-media content for delivery to the user. Because the content is formatted according to the configuration information, the content is compatible with the user's configuration. The configuration determination process involves server contact code placed in the web page of the content provider. When the web page is loaded by the user, the server contact code directs the browser to retrieve code from the delivery management server. When the code is executed by the user, the media player of the user is determined. This information is saved in cookies at the user and is sent to the delivery management server. If the configuration information is indeterminate or incomplete, the user is presented with a preferences page in which the user can indicate the configuration. The preferences page also contains a mechanism for determining the connection speed of the user. The preferences page can also make specific recommendations to the user, e.g., recommend that the user choose a specific media player. The preferences page contains a block of data having a known size. The time required to transfer the block is measured, and the connection speed is then calculated and provided to the delivery management server.

In accordance with a preferred embodiment, the configuration determination process involves server contact code that is placed in the web page of the content provider. When the web page is loaded by the user, the server contact code directs the browser to retrieve scripts from the delivery management server. When the scripts are executed by the user, the media player of the user is determined. This information is saved in cookies at the user and is sent to the delivery management server. The configuration information can then be used by a transcoder that formats the media content according to the configuration information.

If the configuration information is indeterminate or incomplete, the user is presented with a preferences page in which the user can indicate the configuration. This configuration, as determined through the preferences page, is also stored in cookies and sent to the delivery management server to allow formatting of content. The preferences page can also make specific recommendations to the user, e.g., recommend that the user choose a specific media player.

DESCRIPTION OF THE PREFERRED EMBODIMENTS

The preferred embodiments described herein relate to a system, method, and computer program product that allows the remote determination of a user's computer system configuration. This allows multimedia content destined for that computer to be formatted in a manner compatible with the user's configuration. If sufficient configuration information is obtained, the content can be formatted so as to provide the best possible media experience for the user.

Note that in the description that follows, the concept of a user's computer is defined broadly to include the full range of programmable or programmed-devices. A user's computer can be, but is not limited to, a personal computer or other workstation, a laptop, a palmtop, a personal data assistant, or a cell phone.

In accordance with a preferred embodiment, server contact code is contained in a web page sent by a content provider to the user. The server contact code retrieves one or more scripts from a delivery management server. The scripts enable the determination of configuration information of the user's computer system. In an embodiment of the invention, the configuration information comprises the identity and version of the user's media player(s). The configuration information is then returned to the delivery management server. The configuration information can then be used to format the multi-media content appropriately. In an embodiment of the invention, configuration information is also stored locally at the user's computer in the form of cookies. In subsequent hypertext transfer protocol (HTTP) requests, the cookies can be sent to the delivery management server as a way of conveying the configuration information.

If the configuration information is determined to be incomplete or potentially outdated, an additional web page is opened. This is a preferences page, where the user can specify his configuration (e.g., his available or preferred media player type and version, and/or a preferred connection speed) to the delivery management server. The preferences page can also be used to recommend that the user choose a specific media player.

In accordance with a preferred embodiment, a preferences page includes a block of data of known size. This block is transferred into the user's computer as a part of the preferences page. The time required to transfer this block of data is measured in order to determine the connection speed of the user's computer. The connection speed represents an additional piece of configuration information. The connection speed is also stored locally at the user's computer in the form of a cookie. This cookie can also be sent to the delivery management server as a way of conveying the user's connection rate to the delivery management server.

The system of the preferred embodiment basically supports detection of two things: server-to-client connection speed (bandwidth), and media players (including player versions) installed on the client. In regards to connection speed detection, only server-to-client estimation is desired because the media stream will be sent by the server to the client. Some media player control channel data will be sent from the client back to the server, but the quantity of data is vastly smaller than the actual media data being sent from the server.

When detecting media players, the ideal is to be able to detect all of the following: media players installed (e.g. QuickTime, Windows Media Player, RealPlayer, etc.), versions of installed media players (e.g., QuickTime 5.0.2, Windows Media Player 6.4, RealPlayer 8.0), and individual audio and video codecs installed in each media player (Sorenson v3 for QuickTime, Windows Media Video V8, Sony ATRAC for RealPlayer, etc).

For Generic Media's application, it is also useful to know the details of the client environment. Useful information includes operating system version, web browser version, hardware platform, and preferred user interface language. Some of this information is easily obtained (typically as part of an HTTP header that's sent by the client to the server), while other information is either more difficult to obtain or time consuming to obtain and is best done periodically (not for every request). In these cases, it's desirable to save the detected information (as well as any user preferences) in a cookie stored in the client's web browser. When requests are made to Generic Media servers, the web browser will automatically send affiliated cookie data to the server.

Detection System

An overall architecture in accordance with a preferred embodiment includes server contact code embedded in a web page of a content provider. The server contact code directs the user's browser to a delivery management server, which sends one or more scripts to the user. Execution of the scripts can identify the type and version of the user's media player. This delivery management server receives this information from the user. The configuration information can eventually be used to format multi-media content for delivery to the user.

One embodiment of the system of the invention is illustrated in FIG. 1. A content provider 105 is shown delivering information to a user 110. Included in web page 115 is server contact code 120. When the browser of user 110 accesses server contact code 120, the browser establishes contact with delivery management server 125 and asks for one or more player detection scripts 140. Server 125 responds by sending scripts 140 to user 110. In a manner that will be described in greater detail below, the scripts 140, when executed, determine configuration information 135 for user 110. In an embodiment of the invention, this configuration information is stored with user 110 by a process of setting cookies that contain configuration information 135. The cookies are retained by user 110, and when user 110 makes the HTTP request 130 to access the content, configuration information 135, in the form of the cookies, is sent to delivery management server 125. A transcoder (not shown) formats the multi-media content in a manner specified by configuration information 135. The resulting formatted content can then be delivered to user 110 through a streaming server (not shown).

If configuration information 135 is not available (or otherwise requires clarification), an additional script, provided to user 110 as one of the scripts 140, opens a new window that loads a preferences web page 150. With this page, user 110 can explicitly identify configuration information 135 (e.g., the player type and version) through a user interface in preferences page 150. As before, the configuration information 135 can be retained at user 110 in the form of cookies and forwarded to delivery management server 125.

In an embodiment of the invention, a recommendation can be made by the delivery management server to the user, through the preferences page 150, as to a particular media player that the user can or should select. Such a recommendation is based on what is known about the user's options. In such an embodiment of the preferences page 150, the recommendation can be conveyed through a portion of the page. This portion can be thought of as a server interface, since the server communicates to the user through this interface.

As will be described in greater detail below, the preferences page includes a block of data 155 having a known size. The transfer of the block 155 is timed in order to determine the connection speed of the user 10. In an embodiment of the invention, block 155 (known hereinafter as the timing block) is incorporated in an HTML comment in the preferences page 150.

In some contexts of the invention, the delivery management server 125 is one of a set of such servers. Here, the set of delivery management servers services a community of users by means of the invention described herein. Given a user's request for content, the user would be assigned to a specific delivery management server through a selection mechanism that balances the load created by multiple users.

In an embodiment of the invention, the functionality of delivery management server 125 is embodied in a viewer web server interface to a transcoding engine. The transcoding engine, in general, receives content from a content provider and formats ("transcodes") the content in a manner that makes it usable by user 110. The viewer web server interface is a network interface between the transcoding engine and the user 110, that allows content to be requested by user 110. The viewer web server interface receives and processes a content request from the user 110, thereby initiating the transcoding and delivery of the requested content to the user 110. The viewer web server interface sends a reply to user 110's request, redirecting the user 110 to an appropriate streaming server from which to receive the requested media content. Formatted ("transcoded") content is then streamed to the user 110 by a streaming server and/or proxy server (also a part of the transcoding engine). Such a transcoding engine is described in greater detail in U.S. Pat. Nos. 6,407,680 and 6,593,860, and incorporated by reference herein in its entirety. Alternatively, the delivery management server 125 and the viewer web server interface can be implemented as separate servers.

Note that the invention described herein can be implemented in a variety of organizational contexts. For example, the transcoding and delivery management operations described above can be performed by a delivery management service. This service may be, for example, a separate organization or business entity independent of the content provider 105. In this case, web page 115 may be developed by content provider 105 independently of the delivery management service. Web page 115 could then include a logo or other branding images, and/or a "look and feel" specific to content provider 105. Likewise, preferences page 150, though delivered to user 110 by delivery management server 125, could also be developed by content provider 105 independent of the delivery management service.

Independence of the delivery management service and content provider 105 would also allow the delivery management service to make service changes on its own. The delivery management service would be free to upgrade its service by adding or otherwise modifying functionality. Player detection scripts 140 could be improved, for example, so as to make the player detection process faster or more comprehensive, independent of a specific content provider 105.

Figure 2:
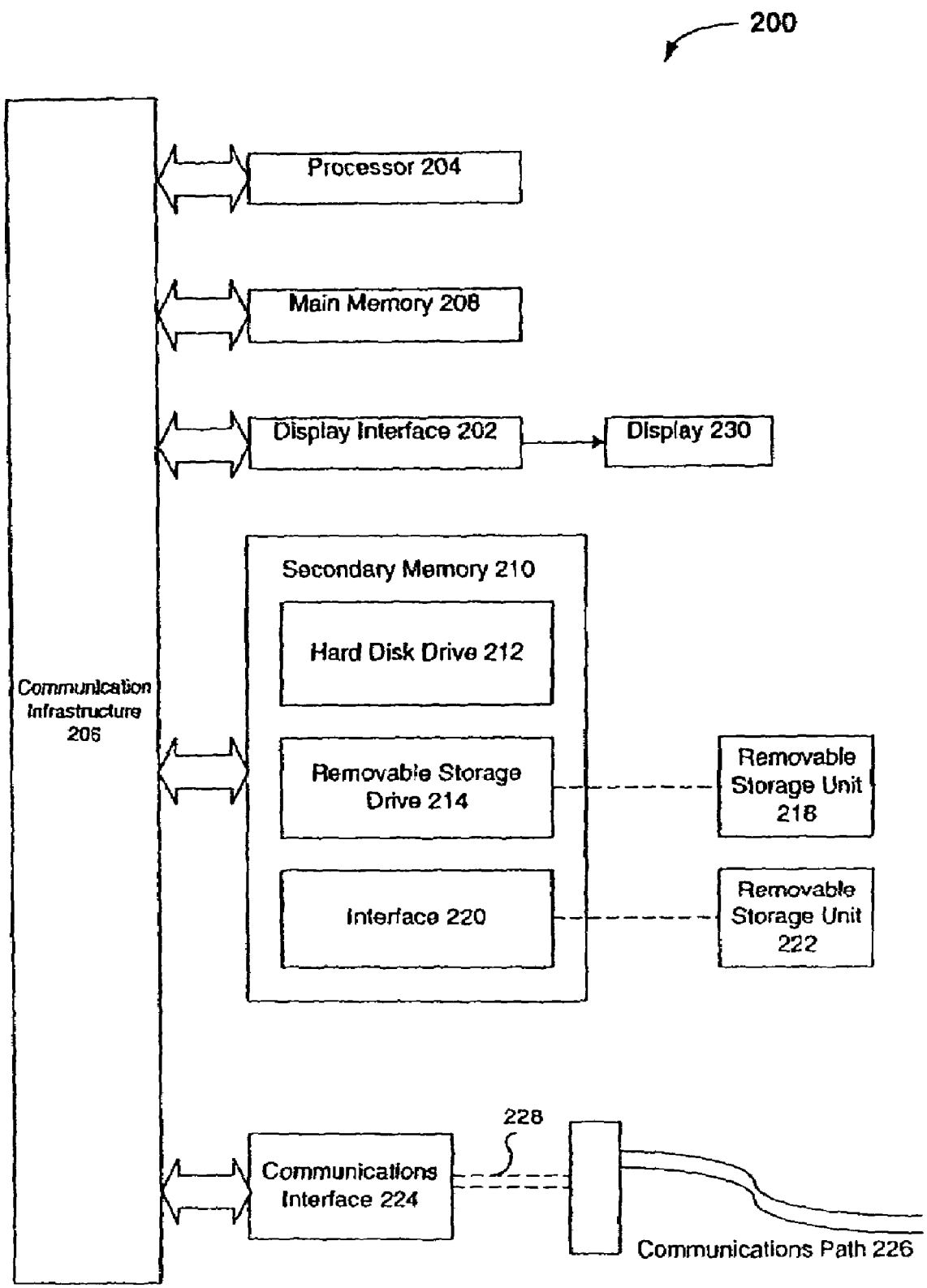
FIG. 2 is a block diagram illustrating the computing environment of an embodiment of the invention.

The transcoding process could also be upgraded independent of content provider 105, to accommodate additional media formats or to provide faster transcoding, for example. The delivery management server 125 may be implemented using hardware, software or a combination thereof. In particular, server 125 may be implemented using a computer system or other processing system. An example of such a computer system 200 is shown in FIG. 2. The computer system 200 includes one or more processors, such as processor 204. The processor 204 is connected to a communication infrastructure 206 (e.g., a bus or network). Various software embodiments can be described in terms of this exemplary computer system. After reading this description, it will become apparent to a person skilled in the relevant art how to implement the invention using other computer systems and/or computer architectures.

Computer system 200 also includes a main memory 208, preferably random access memory (RAM), and may also include a secondary memory 210. The secondary memory 210 may include, for example, a hard disk drive 212 and/or a removable storage drive 214, representing a magnetic tape drive, an optical disk drive, etc. The removable storage drive 214 reads from and/or writes to a removable storage unit 218 in a well known manner. Removable storage unit 218 represents a magnetic tape, optical disk, etc. As will be appreciated, the removable storage unit 218 includes a computer usable storage medium having stored therein computer software and/or data.

Secondary memory 210 can also include other similar means for allowing computer programs or input data to be loaded into computer system 200. Such means may include, for example, a removable storage unit 222 and an interface 220. Examples of such may include a program cartridge and cartridge interface (such as that found in video game devices), a removable memory chip (such as an EPROM, or PROM) and associated socket, and other removable storage units 222 and interfaces 220 which allow software and data to be transferred from the removable storage unit 222 to computer system 200.

Computer system 200 may also include a communications interface 224. Communications interface 224 allows software and data to be transferred between computer system 200 and external devices. Examples of communications interface 224 may include a modem, a network interface (such as an Ethernet card), a communications port, a PCM-CIA slot and card, etc. Software and data transferred via communications interface 224 are in the form of signals 228 which may be electronic, electromagnetic, optical or other signals capable of being received by communications interface 224. These signals 228 are provided to communications interface 224 via a communications path (i.e., channel) 226. This channel 226 carries signals 228 into and out of computer system 200, and may be implemented using wire or cable, fiber optics, a phone line, a cellular phone link, an RF link and other communications channels. In an embodiment of the invention, signals 228 can convey information required by the delivery management server 125, such as HTTP request 130 and configuration information 135. Signals 228 can also convey information to user 110, such as scripts 140 and preferences page 150.

In this document, the terms "computer program medium" and "computer usable medium" are used to generally refer to media such as removable storage drive 214, a hard disk installed in hard disk drive 212, and signals 228. These computer program products are means for providing software to computer system 200. The invention is directed in part to such computer program products.

Computer programs (also called computer control logic) are stored in main memory 208 and/or secondary memory 210. Computer programs may also be received via communications interface 224. Such computer programs, when executed, enable the computer system 200 to perform the features of the present invention as discussed herein. In particular, the computer programs, when executed, enable the processor 204 to perform the features of the present invention. Accordingly, such computer programs represent controllers of the computer system 200.

Detection Method

In a method in accordance with a preferred embodiment, the configuration information of a user's computer is determined and sent to a delivery management server. The delivery management server then passes the configuration information to a transcoder that formats multi-media content according to the configuration information. The formatted content can then be sent to the user.

An overall process in accordance with an embodiment of the invention is illustrated in FIGS. 3A-3D. The process begins at step 305. In step 310, the user begins loading a web page of a content provider. As described in Section 11, the web page contains server contact code which directs the user's browser to the delivery management server. In an embodiment of the invention, this is accomplished in an HTML header of the content provider's web page. For example, the HTML header could contain the following server contact code:

<SCRIPT SRC="http://js.genericmedia.net/js"LANGUAGE=javascript></SRC>, where "js.genericmedia.net" represents the delivery management server.

In an embodiment of the invention, execution of the server contact code is initiated by an action of the user, such as clicking on a control or link in the content provider's web page, or by entering an explicit command. In an alternative embodiment, the server contact code is executed automatically after loading the web page. In step 320, the user's browser fetches player detection code from the delivery management server ("js" in the example above). In step 325, the media players that can be used by the user are determined. This step will be described in greater detail below. In step 330, the identity of the media players is recorded in one or more cookies in the user's computer. This step will also be described in greater detail below.

In conjunction with this step, a decision is made at the delivery management server (step 331) as to whether the received configuration information is sufficient to format the requested multi-media content. If cookies are received and verified as having valid settings, a minimal HTTP response is sent back, implying validity. If the received configuration information is sufficient to format the requested multi-media content, processing continues at step 335, described below. An additional decision point (similar to step 331) can be made between step 320 and 325 in the method described and illustrated with reference to FIG. 3A. That is, if sufficient information is received, player detection can be completely skipped in one embodiment. In another embodiment, some lightweight player detection even when sufficient info has been received. In either case, a decision of what, if any, player detection code to send may be performed after step 320 when the client requests it from the server.

If js does not receive valid cookies (i.e., if configuration information at the user is insufficient or nonexistent), the method continues at step 332. In step 332 a preferences page is displayed for the user. In an embodiment of the invention, this is accomplished by sending the user a segment of javascript that opens a new window which loads the preferences page. The preferences page allows the user to deliberately indicate to the delivery management server the configuration or preferences of the user with respect to the media player, and/or the user's connection speed. In an embodiment of the invention, the preferences page can also recommend to the user that a specific media player be chosen. Also, as will be described in greater detail below, the preferences page includes a mechanism through which the connection speed of the user's computer can be determined and relayed to the delivery management server.

In step 333, the preferences provided by the user are received by the user's computer. In step 334, the preferences are stored in cookies. Processing then continues at step 335. In step 335, the user requests the multi-media content, made available by the content provider through a web page, by making an HTTP request. Such a request can be made, for example, by clicking on some region of the content provider's web page. As a part of this request, any cookies that contain configuration information are sent to the delivery management server. The cookies could, for example, describe the media player type and version. The cookies could also store the measured connection speed, as well as any preferred connection speed that the user might have. The user may, for example, wish to use only a portion of the available bandwidth for streaming. Here, the user would choose a slower speed than the maximum permitted by the user's configuration. The process concludes at step 370.

An example of an HTTP request ("GET") is as follows. Existing cookies (gm Players, gmPlayerPref, and gmBitratePref) are sent to the delivery management server as part of the GET command:

GET/xc?p=keith&s=media/Trailer.mov&v=1 HTTP/1.1

Accept: image/gif, image/x xbitmap, image/jpeg, image/pjpeg, application/vnd.ms-powerpoint, application/vnd.ms-excel, application/msword,\*/\*

Accept-Language: en-us

Accept-Encoding: gzip, deflate

User-Agent: Mozilla/4.0 (compatible; MSIE 5.5; Windows NT 5.0)

Host: xc.genericmedia.net

Connection: Keep-Alive

Cookie:gmPlayers=v1% 2F % 2FQuickTime-4.12% 2F % 2FReal-6.0.7.788% 2F % 2FWMP-6.4% 2F %2F; gm PlayerPref=real; gmBitratePref=300000

The server uses the URL information and cookie information to decide to transcode the movie "media/Trailer.mov" (in user Keith's account) to a 300 kbps encoding suited for RealPlayer G2:

HTTP/1.1 200 OK

Date: Mon, Jul. 16, 2001 23:52:00 GMT

Server: Apache/1.3.14 (Unix) mod_perl/11.24

Connection: close

Expires: Thu, Dec. 1, 1994 16:00:00 GMT

Pragma: no-cache, no-store, must-revalidate, no-transform

Transfer-Encoding: chunked

Content-Type: audio/x-pn-realaudio 41 rtsp://64.124.76.136:554/cache/
Mlk3JeFIY0209200d7dn-a/Trailer.rm 0

Note that a user may be configured with more than one media player. If so, it may be unclear how to format the content, i.e., which player to choose. Moreover, the user may have a particular preference for one player over another. The preferences page provides a way to resolve these situations, by letting the user convey a player preference to the delivery management server. In an embodiment of the invention, the preferences page can convey a recommendation to the user as to which media player might provide the best results.

There may also be cases where the above process fails to identify the user's configuration with certainty. The player detection process may not be able to unambiguously ascertain the user's media player, for example, and the user might not know enough to answer the queries on the preferences page. In such cases, the delivery management server may make one or more inferences based on what is known about the user's configuration. For example, if it is known that the user has a MACINTOSH platform, it can generally be assumed that QUICKTIME is available on the platform, since MACINTOSH computers are often equipped with QUICKTIME. Other such associations may also be used to infer configuration information that is otherwise unavailable. In an embodiment of the invention, confirmation of such an inference can be had by soliciting the user for confirmation, through the preferences page.

Figure 3A:
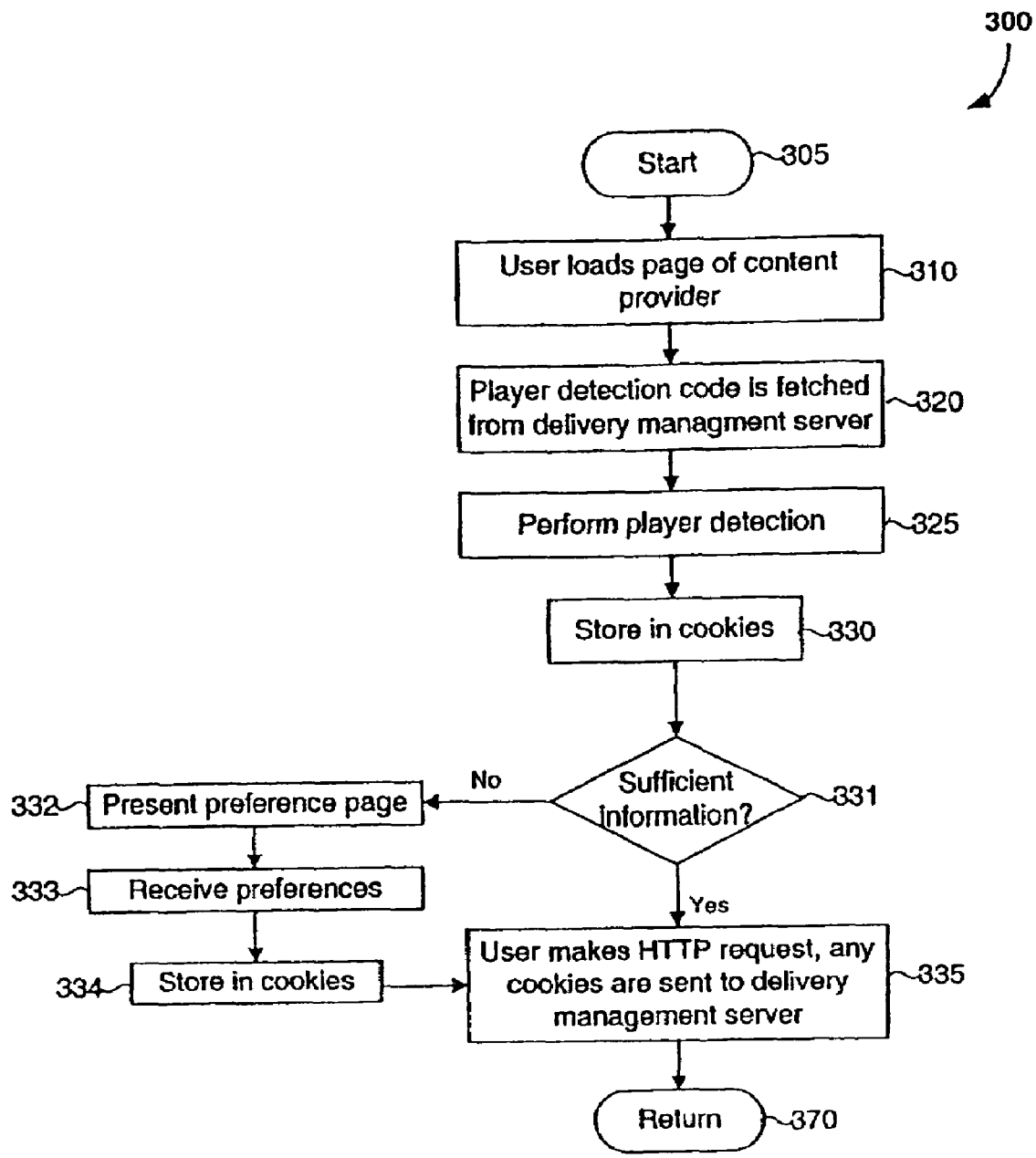
FIG. 3A is a flow chart illustrating the overall process of an embodiment of the invention.
Figures 3B, 3C:
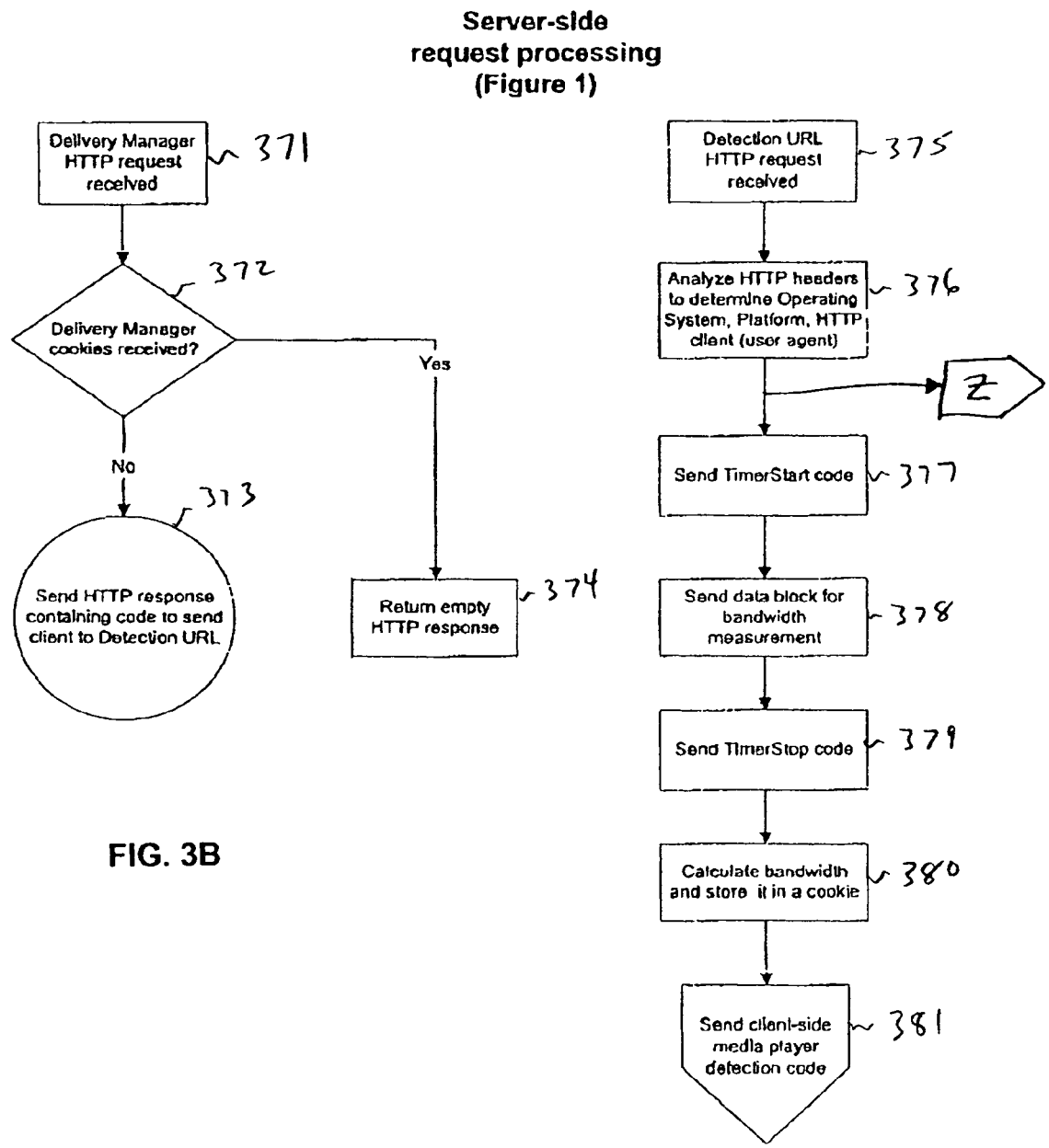
FIG. 3B is a flow chart illustrating server-side request processing in accordance with an embodiment including receiving a delivery manager HTTP request.
FIG. 3C is a flow chart illustrating server-side request processing in accordance with an embodiment including receiving a detection URL HTTP request.

FIG. 3B is a flow chart illustrating server-side request processing in accordance with an embodiment of the invention including receiving a delivery manager HTTP request 371. It is checked at step 372 whether delivery manager cookies have been received. If not, then at step 373, a HTTP response is sent containing code to send client to detection URL. If so, then at step 374, an empty HTTP response if returned.

Figure 3D:
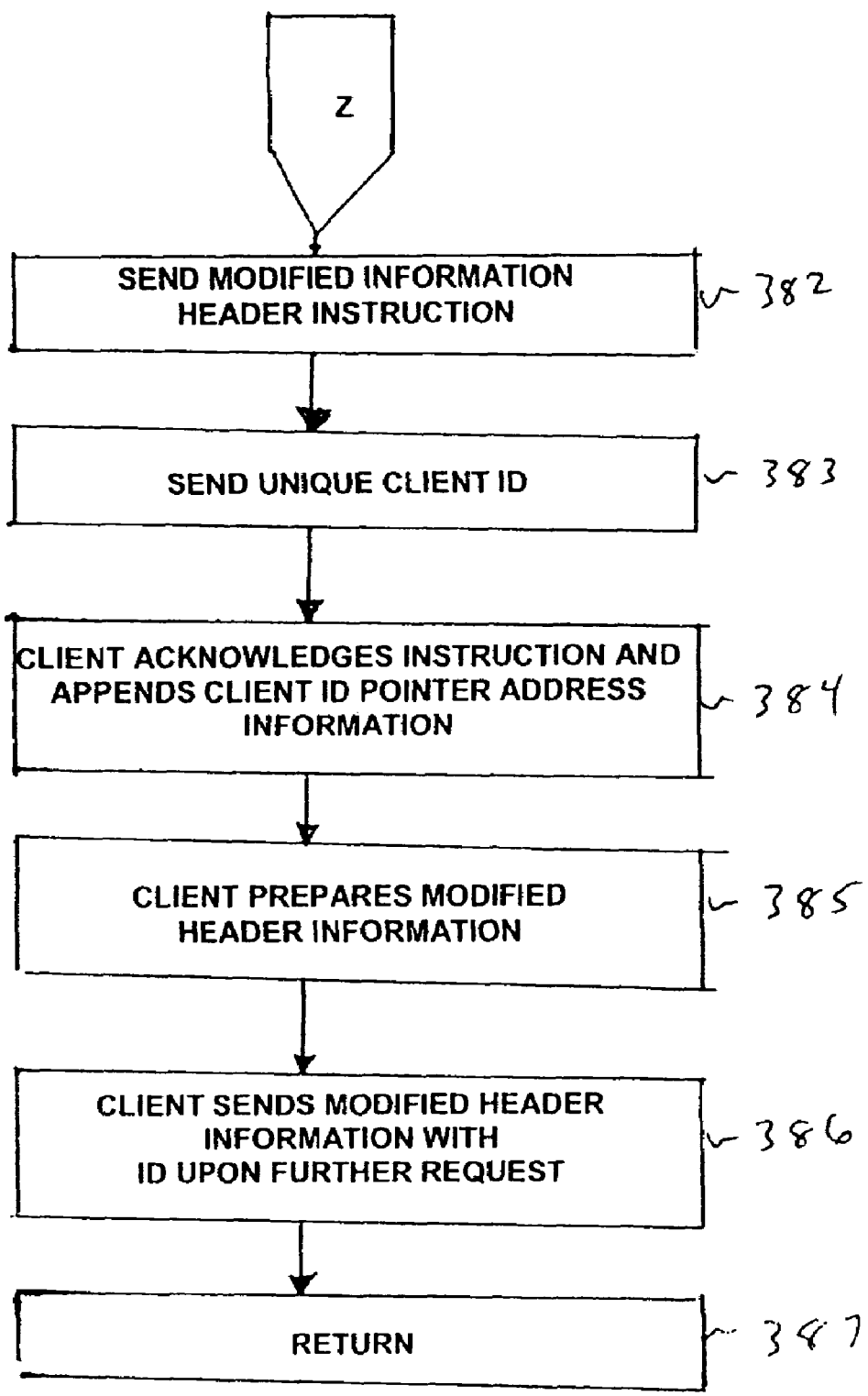
FIG. 3D is a flow chart illustrating further request processing according to an embodiment of the invention.

FIG. 3C is a flow chart illustrating server-side request processing in accordance with a preferred embodiment including receiving a detection URL HTTP request 375. At step 376, HTTP headers are analyzed to determine configuration information of the client. Among the information determined is operating system, platform and HTTP client or user agent, as illustrated. As understood from further description herein, e.g., with reference to FIGS. 7-9 and elsewhere, there are many features, characteristics and variances of client computers that may be determined at step 376. In addition, particular items of information that are desired to be received at the server may be indicated to the client as illustrated at FIG. 3D and described in more detail below.

To determine the bandwidth or connection speed of the client, a TimerStart code may be sent at step 377. A data block or timing block is sent to the client for bandwidth measurement at step 378. A TimerStop code is sent at step 379. In one embodiment, the bandwidth is calculated from the amount of the data that is communicated during the time as determined from the difference between the TimerStop time and the TimerStart time, at step 380, and stored in a cookie. As described in more detail below, instead of fixing the time and determining the bandwidth based upon how much data is sent during that time, the chunk size or timing block size may be fixed and the bandwidth determined based on how much time it takes to communicate it. Advantageously, the chunk size or timing block size may be selected so that the exercise lasts just above a minimum time needed to make a tolerably accurate bandwidth determination. At step 381, a client-side media player detection code is sent.

Detection Mechanism Details

In an exemplary usage scenario, users may be typically connecting from a personal computer or a PDA (Palm, PocketPC). The connection may be generally via HTTP from either a web browser or a media player that can make HTTP requests.

A difficult aspect of this type of environment is that the client device software may typically not be written to or otherwise controlled, and instead works within the constraints of existing clients. More specifically, there may be no way to a particular existing web browser (e.g., Internet Explorer, Netscape, Mozilla, etc.) and thus configuration detection algorithms must work within their support of Javascript and work around bugs/quirks of individual browser versions.

Likewise, different media players support varying levels of version and installed-codec queries. In many cases (particularly for older players) there's no way to directly query whether a particular codec is installed. This is instead done indirectly relying on known configurations. For example, if the media player is Windows Media Version 7.0, then it is understood that version shipped with Windows Media Video 7, Microsoft MPEG4v3, and Microsoft ISO-MPEG4v1 video codecs.

In the case of PDA's, media player detection may be typically simplified by the fact that current media player support for PDA's is limited. For example, on PalmOS based PDA's, there may be only a single video player that is available and/or supported. On the PocketPC, as another example, Microsoft's Pocket Windows Media Player was the only available player for a long-time. RealNetworks and PacketVideo have also introduced players for PDA's. With limited player choices, the detection logic can often be simplified to 1:1 mappings between a given PDA and a (default) media player.

Bandwidth measurement is also not easy to estimate within the constraints of HTTP and Javascript. Bandwidth measurement tools may typically make their estimations by timing how long it takes a client to receive a known quantity of data. Higher bandwidth estimation accuracy may be obtainable if the time measurement is restricted to just the time spent actually transmitting the data, and if the data-size truly estimates the actual number of bites transmitted. Ideally, multiple measurements are taken to average out anomalies.

In an exemplary implementation, design requirements/constraints (for detection mechanisms) may include:

Must be done from within a web page (in a web browser);

Code/scripting must only use languages which are already supported by the client's existing web browser (e.g., Javascript, VBScript, HTML);

User must not need to install any downloaded modules/plugins;

Detection should be done as quickly as possible and as least invasively as possible (ideally, user shouldn't notice that detection code is running);

To do bandwidth measurement within the above constraints, measuring bandwidth via HTML and Javascript code may be one method. A small Java applet could allow for finer-grained and more sophisticated measurement algorithms, but may then require a downloaded applet and a Java runtime environment, both of which may violate the design constraints.

Bandwidth measurement may be advantageously done by timing how long it takes for a chunk of HTML data to be received by the client. "Random" ASCII data or other random data is preferably used to prevent compression by data-compressing modems, routers, and webservers (which would reduce the actual number of bits received, and thus affect the bandwidth calculation). In the interests of minimal user impact, the bandwidth measurement calculation is preferably only run once, and alternatively multiple times. The size of the data chunk may be selected to be 20 kilobytes such as may balance the need for expedient measurement for modem users against the need for accurate measurement for users on LAN connection speeds of around 300 kbps.

Again, due to the design constraints more advanced/accurate bandwidth measurement techniques may be undesirable. The measurements may be still vulnerable to calculation corruption. Other applications or browser windows may be sending data, thus slowing the transmission time, for example. Also, intermediate routers may be buffering data and transmitting it in large chunks. Moreover, data may still get compressed by intermediate routers/modems. The data may burst over the last network link, e.g., from the firewall to the computer, or in the browser, e.g., it may parse/execute Javascript in sections, any or all of which may falsely decrease the transmission time.

For clients that don't support Javascript, default detection results may be used. Users could change their preferences at a later date by clicking a link to go to a settings/preferences changing web page. Default detection results may be advantageously customized for different clients based on information gleaned from the HTTP Request headers (operating system, hardware platform, e.g.). In one embodiment, a Macintosh client might have as a default that QuickTime is installed, while a PocketPC client might have this default that Pocket Windows Media Player is installed. For connecting via a wireless modem carrier, the default bandwidth might be 56 kbps.

Persistent Data

A preferred implementation utilizes "cookies" for storing persistent data between user sessions. Cookies are name-value pairs stored by an HTTP client which are associated with a domain. When the client makes subsequent HTTP Requests, it sends with the request cookies that are affiliated with the HTTP server's domain. Cookies can be further specified to expire (be deleted) after a certain date.

Separate cookies may be created/used in an exemplary implementation for storage of things like measured bandwidth, detected media players (and their versions), user bitrate preference, user media player preference for streaming, and/or user media player preference for downloaded content. Each cookie may have its own expiration date which can be utilized to set the frequency at which portions of detected information could be considered stale and due for re-detection.

Specifically, things which consume a relatively large amount of time to detect (bandwidth and versions of installed media players) may be done once and then only re-detected periodically (or upon user request). Much of the difficulty and complexity of typical configuration detection implementations is due to only being able to write/control the server-side environment. Advantageously, client-side platforms, browsers, media players, scripting languages, bugs, etc., need not always be worked within and around in accordance with a preferred embodiment, e.g., as being considered unchangeable. Per the design requirements, upgrading/changing the client's installed software may be now allowed, although may alternatively be specifically not allowed.

Implementation Example

In an exemplary implementation in accordance with a preferred embodiment, many obstacles can be averted because there is much more freedom in the client-side environment. Instead of devising indirect querying methods to determine client software configurations or capabilities, direct query support is advantageously designed in from the start. Likewise, client HTTP header values can be specified (and/or new headers added) to provide detailed client information.

In this light, FIG. 3D is a flow chart illustrating further request processing according to an embodiment of the invention. A modified information header instruction is sent at step 382. That is, a request is sent to the client for different information than the client either already has sent or is prepared to send based on a standard or previous request. A unique client ID is sent at step 383, so that the particular information requested and then received from the client is associated with that client. For example, different information may be requested of other clients. Advantageously, different end user machines may have unique ID codes for detection built in.

Client operations 384-386 illustrate an effect on client-side processing due to server operations 382-383. At step 384, the client acknowledges the instruction received based on step 382 and appends client ID pointer address information to the requested header information based on step 383. The client prepares modified header information at step 385 depending on the information requested in the instruction of step 382. The client sends at step 386 modified header information with ID upon further request. The subroutine ends at step 387. The modified information may include information that was not included in information previously received or that the client understood was desired by the server. This advantageously permits the server to get all of the information desired. The modified information may also exclude information that was included before or that the client would otherwise send to the server. This advantageously can reduce the amount of data being sent, particularly when some of the data is not desired for processing at the server or otherwise for transcoding and/or otherwise providing media transcoding services.

Adaptations of client hardware, client user interface version or other client configuration features may be included in the configuration information requested by the server and/or sent from the client. The modified header information instruction may be prepared according to this adaptation information. These adaptations, e.g., may be according to specific browser configurations at the client.

The design requirements of implementation architectures may be designed to provide more freedom for writing custom client software. Without the programming restraints of Javascript, e.g., custom extensions (perhaps written in C/C++) can implement more advanced or more accurate bandwidth measurement algorithms.

A form of persistent storage may be provided so that detected information can be stored from one session to another. This can advantageously reduce the time spent on bandwidth measurement. Alternatively, the bandwidth estimate may be measured and/or updated constantly, periodically or as requested based on timing/timestamps of data being sent from the server to the client. Within a given session, e.g., detection information may be kept in memory so that it can be sent by the client with requests to the server.

Implementation Example Details

As mentioned previously, direct reporting of client capabilities is generally easier and more efficient than indirect querying. For media player detection, the client may advantageously have a way of quickly/easily knowing what media players are installed on a client. According to one embodiment, hooks are provided into the operating system (or software installation manager) so that detection software can directly query for what media player software is installed, what version it is, what version of codecs are installed, and/or for other configuration information. If the implementation is done such that only one media player is installed and/or that additional installations aren't available, or that the detection management software is integral to the media player, it might be advantageous to have the media player software directly report this information instead.

On the server-side, direct correlations may be made about a client's actual media player capabilities from the version information reported. For example, it might be known that version 1.0.4 of the V XYZ video codec is capable of decoding a video compressed with the XYZ algorithm, but that the decoder requires the video frame/size dimensions to be multiples of 8 pixels. Another example might be that if the client reports it has audio codec A ABC version 1.1 and audio codec A DEF version 3.0 that the server must not send data encoded with any other audio codec, and that the compression algorithm used must be decodable by one of the client's audio codecs.

All bandwidth measurement algorithms fundamentally boil down to measuring how long it takes to receive a known-size chunk of data or how much data is communicated in a predetermined period of time. Advantageously, an algorithm is described in more detail below with reference to FIG. 5B including sending one or more of multiple chunks of data such that the chunk-size or timing block size may be varied or selected according to a current approximated bandwidth.

Detection information may be used on the server side to decide on a transcoded bitrate and media player format/version. It is generally inefficient and resource intensive to provide transcodes in all possible combinations of bandwidths and codec. The codecs used may be limited, e.g., to the most commonly installed and the bitrates encoded may be limited to ones that supported the most common target audiences, e.g., 20 kbps for 28.8 modem, 34 kbps for 56 k modems, 90 kbps for ISDN, 300 kbps for DSL, and 500 kbps for cable-modem.

Figure 4A:
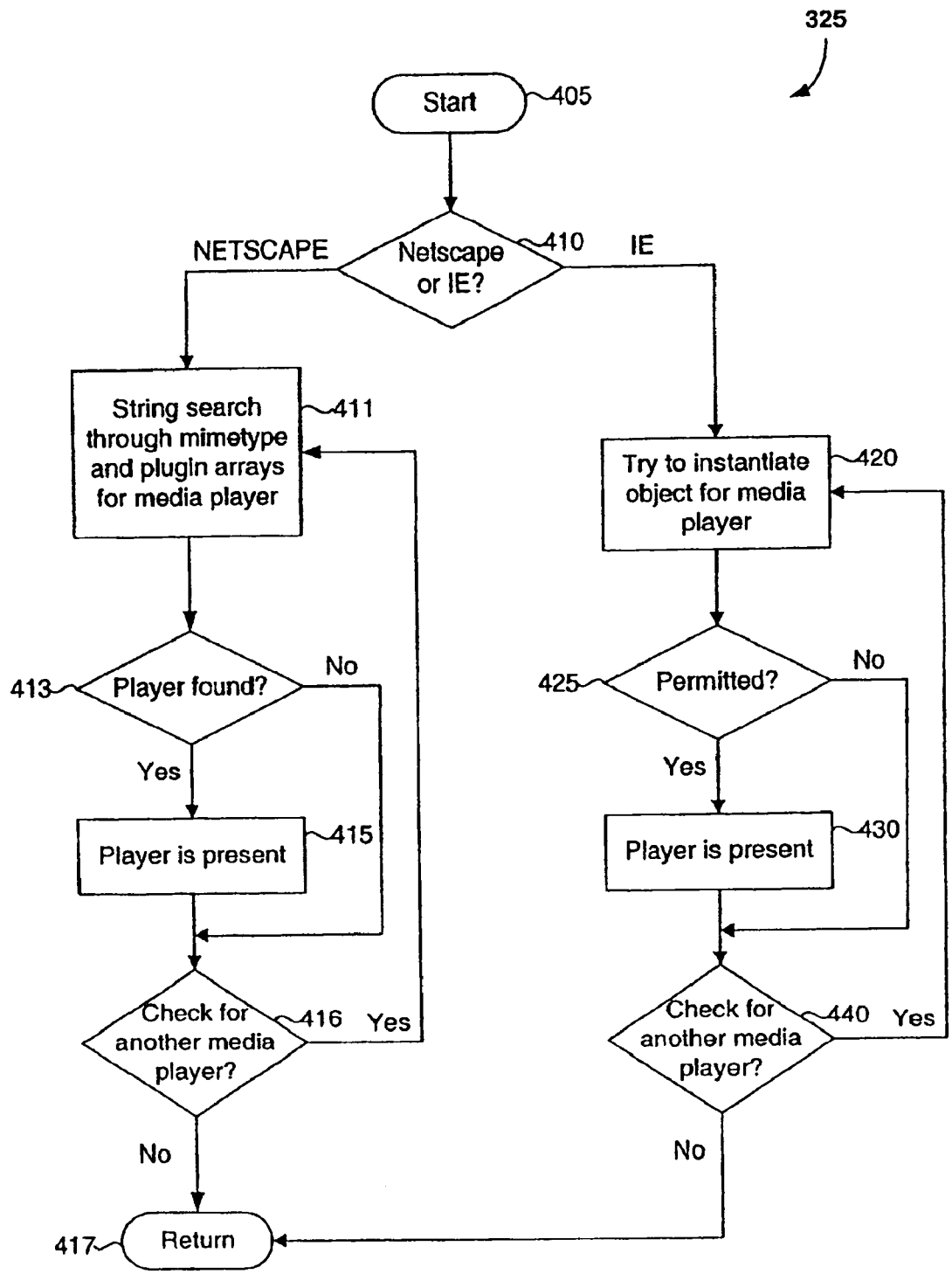
FIG. 4A is a flow chart illustrating the process of media player detection, according to an embodiment of the invention.

Referring back to Step 325 of FIG. 3A, the step of performing player detection, is described in greater detail in FIG. 4A. This process begins at step 405. In step 410, a determination is made as to what browser the user has. Typically, the user's browser will be either a version of NETSCAPE NAVIGATOR, or a version of INTERNET EXPLORER (IE). If the user has NETSCAPE NAVIGATOR, then the process continues at step 411. In step 411, a string search for a given media player is performed through the resident mimetype array and plugin array. The mimetype array is a mapping of what application to load upon receiving a response with a given mimetype. Any given media player typically has its own mimetype. The plugin array is a listing of all browser plugins that have been installed; typically, each has registered a corresponding mimetype. As a result, these arrays will typically contain character strings that indicate the media player(s) resident on the user's computer. QUICKTIME is indicated by the string "Quick- Time" for example, and WINDOWS MEDIAPLAYER is indicated by the string "video/x-msvideo".

If in step 413 the string search is successful, then the player is determined to be present in step 415. Otherwise, processing continues at step 416. In step 416 a determination is made as to whether another media player is to be sought. If so, processing returns to step 411, and a string search is conducted for another media player. In the illustrated embodiment, therefore, multiple string searches will generally be performed, although the invention can be implemented to perform a single search. The process concludes at step 417.

Note that different versions of a given player may be registered with the browser using slightly different names or properties. Detection of these distinctions by string searches can provide information as to specific versions. In an embodiment of the invention, the string searches are implemented using javascript.

If, in step 410, it is determined that the user's browser is INTERNET EXPLORER, then the process continues at step 420. Here, the browser is asked to instantiate an object for a given media player and version. In an embodiment of the invention, this instantiation is done using Vbscript. Creation of a REALPLAYER version 5 object, for example, would be attempted with the statement CreateObject("RealPlayer.RealPlayer™ ActiveX Control (32-bit)".

If, in step 425, this instantiation is permitted, this implies that the media player is in fact present on the user's computer, as shown in step 430. The process then continues at step 440. If, in step 425, instantiation of the given media player object is not permitted, then it can be assumed that the media player is not resident at the user's computer. In step 440, a determination is made as to whether the presence of any other media player should be ascertained. If so, the process returns to step 420 and another attempt will be made, this time to instantiate an object for a different media player. If, in step 440, a determination is made that no other media player will be sought, then the process concludes at step 417. Note that differences between players, especially differences between versions of a player, can be detected by corresponding differences in how player objects are instantiated in step 420. Also, for player objects that support version queries (e.g., QUICKTIME and REALPLAYER), the player can be asked directly about its version.

Windows Media Player Detection

Figure 4B:
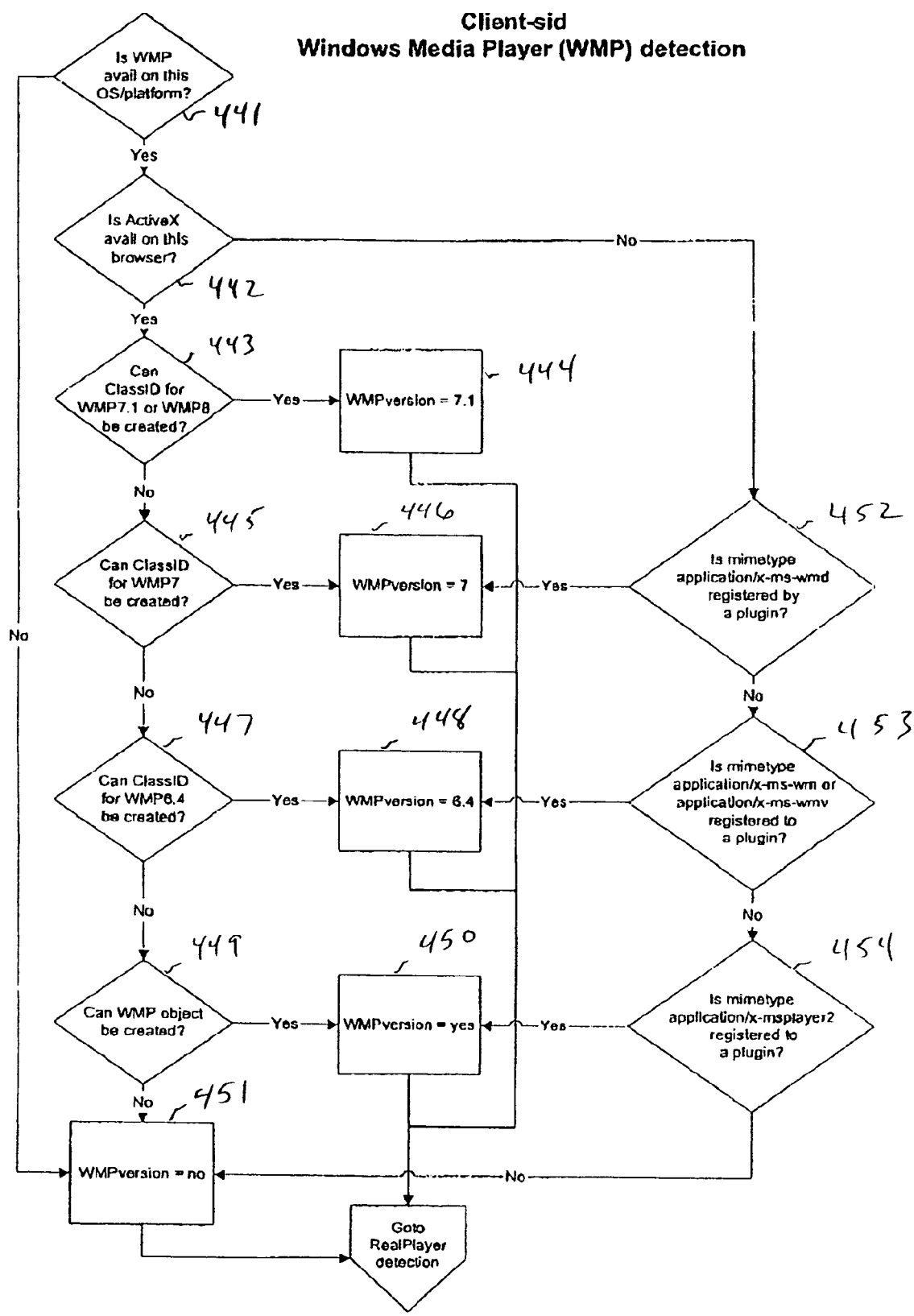
FIG. 4B is a flow chart illustrating client-side windows media player (WMP) detection in accordance with an exemplary embodiment of the invention.
Figure 4C:
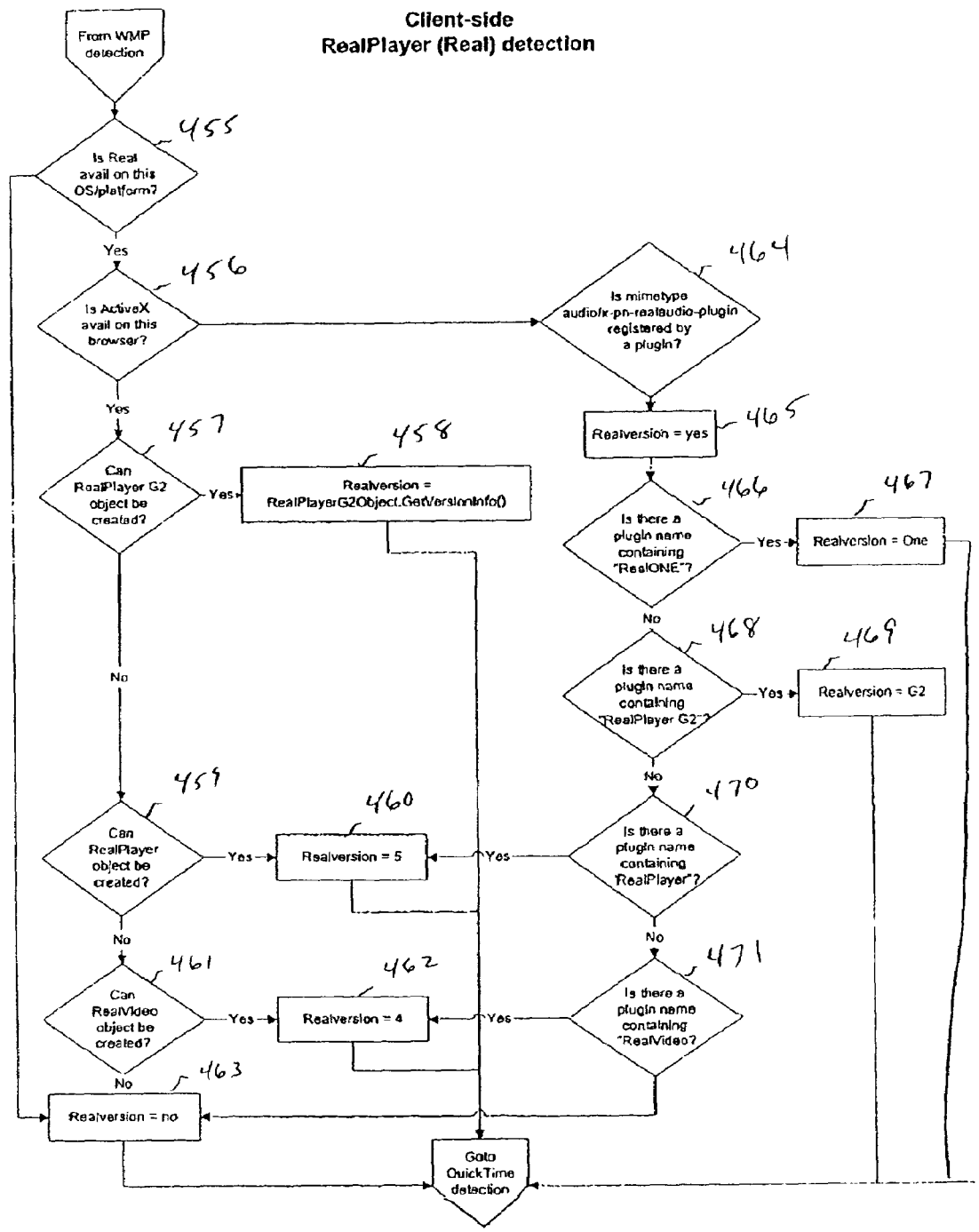
FIG. 4C is a flow chart illustrating client-side RealPlayer (Real) detection in accordance with another exemplary embodiment of the invention.

FIG. 4B is a flow chart illustrating client-side windows media player (WMP) detection in accordance with an exemplary embodiment of the invention. At step 441, it is checked whether WMP is available on this client's OS/platform. If not, then WMP version is set to no at step 451 and the method moves on to RealPlayer detection in accordance with this example. If so, then at step 442, it is checked whether ActiveX is available on the client browser. If yes, then at step 443 it is checked whether ClassID for WMP 7.1 or WMP 8 may be created. If yes, then at step 444, WMP version is set to version 7.1 and the process moves to RealPlayer detection according to FIG. 4C is this example. If it is determined at step 443 that a ClassID for either WMP 7.1 or WMP 8 cannot be created, then at step 445, it is checked whether ClassID for WMP 7 may be created. If so, then WMP version is set to WMP 7 and the process moves to RealPlayer detection. If at step 445, it is determined that ClassID for WMP 7 cannot be created, then at step 447 is it checked whether that for WMP 6.4 may be created, and if so, WMP version is set to 6.4 and if not, then the process moves to step 449. There it is checked whether a WMP object may be created, and if so, WMP version is set to yes, and if not, then WMP version is set to no, and either way, the process moves to RealPlayer detection as illustrated at FIG. 4C.

If the result of the checking at step 442 whether ActiveX is available on the client browser is no, then the process moves to step 452. It is checked at step 452 whether mimetype application/x-ms-wmd is registered by a plugin. If so, then WMP version is set to version 7 ending the WMP detection procedure. If not, then at step 453, is it checked whether mimetype application/x-ms-wmv is registered to a plugin. If so, then WMP version is set to version 6.4 ending the sub-routine. If not, then at step 454, it is checked whether mimetype application/x-msplayer2 is registered to a plugin. If so, then WMP version is set to yes, and if not, then EMP version is set to no, and either way, the process moves to RealPlayer detection.

RealPlayer Detection

Figure 4D:
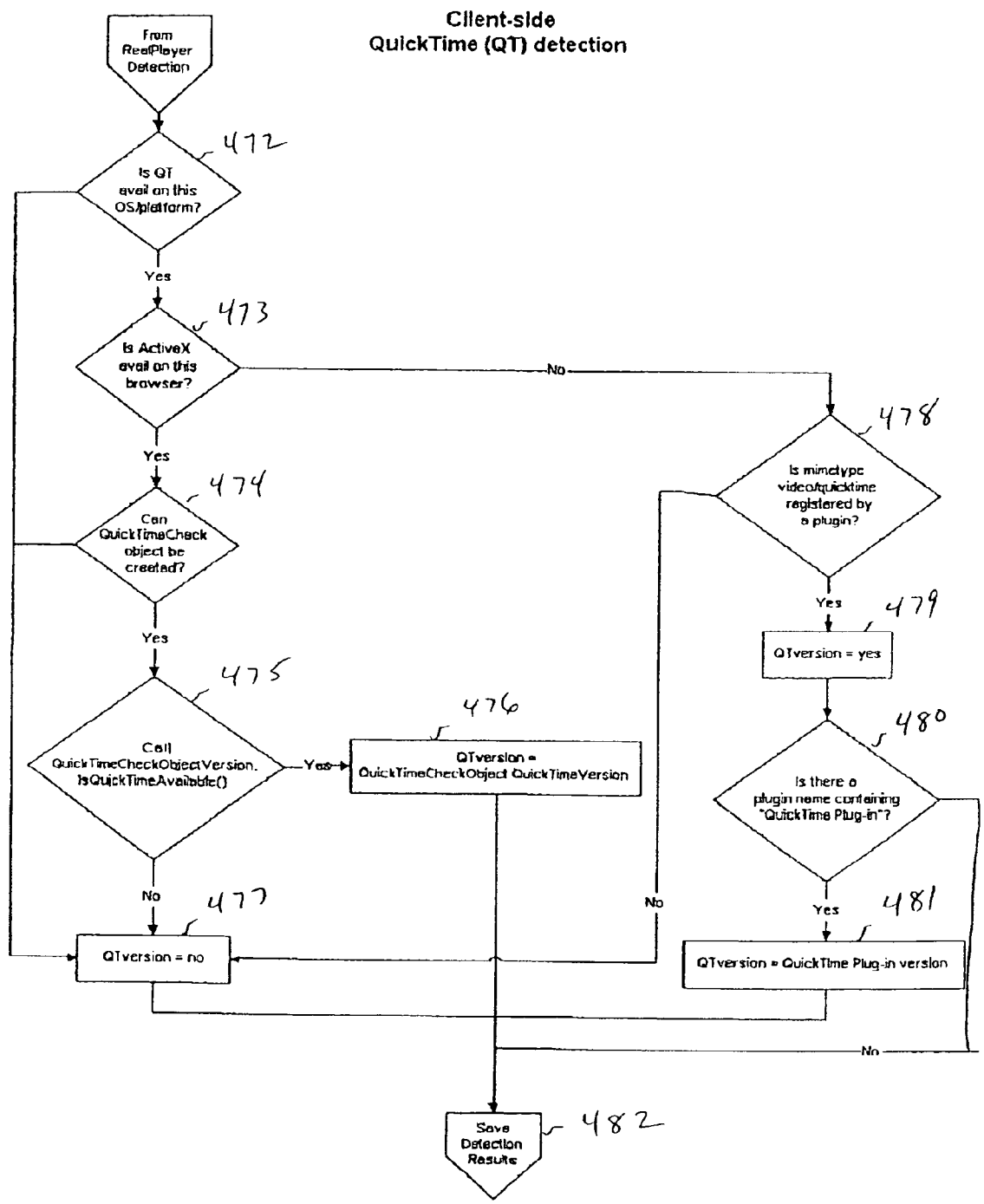
FIG. 4D is a flow chart illustrating client-side QuickTime (QT) detection in accordance with an exemplary embodiment of the invention.

FIG. 4C is a flow chart illustrating client-side RealPlayer (Real) detection in accordance with an exemplary embodiment of the invention. At step 455, it is checked whether Real is available on this client's OS/platform. If not, then Realversion is set to no ending the sub-routine and moving the process on to QuickTime detection. If so, then at step 456, it is checked whether ActiveX is available on this browser. If yes, then at step 457 it is checked whether a RealPlayer G2 object may be created. If so, then Realversion is set to RealPlayerG2Object.GetVersioninfo( ) and the process moves to QuickTime detection as illustrated at FIG. 4D. If not, then at step 459, it is checked whether a RealPlayer object may be created. If yes, then Realversion is set to version 5 ending the sub-routine, and if no, then the process moves to step 461 where it is checked whether a RealVideo object can be created. If yes, the Realversion is set to version 4, and if not then Realversion is set to no and either way, the sub-routine is ended.

If at step 456, it is determined that ActiveX is not available on this browser, then the sub-routine moves to step 464, as illustrated at FIG. 4C, where it is checked whether mimetype audio/x-pn-realaudio-plugin is registered by a plugin. At step 465, Realversion is set to yes. Then, at step 466, it is checked whether there is a plugin name containing "Reane". If so, then Realversion is set to One at step 467 ending the sub-routine. If not, then at step 468, it is checked whether there is a plugin name containing "RealPlayerG2", and if so, then Realversion is set to G2 ending the sub-routine. If not, then at step 470, it is checked whether there is a plugin name containing "RealPlayer". If so, then Realversion is set to version 5, and if not, then at step 471, it is checked whether there is a plugin name containing "Realvideo". If so, then Realversion is set to version 4, and if not, then Realversion is set to no, and either way, the process moves to FIG. 4D and QuickTime detection.

QuickTime Player Detection

FIG. 4D is a flow chart illustrating client-side QuickTime (QT) detection in accordance with an exemplary embodiment of the invention. At step 472, it is checked whether QT is available on this OS/platform. If no, then QTversion is set to no ending the sub-routine. If yes, then at step 473, it is checked whether ActiveX is available on this browser. If yes, then at step 474, it is checked whether a QuickTimeCheck object can be created. If not, then QT version is set to no, and if so, then the sub-routine moves to step 475. There it is checked whether QuickTime is available by using, Call QuickTimeCheckObjectVersion-.IsQuickTimeAvailable( ). If the result of the checking at step 475 is no, then Qtversion is set to no, and if the result of step 475 is yes, then QTversion is set to QuickTimeCheckObject.QuickTimeVersion, and either way, the sub-routine is ended upon saving of the detection results at step 482.

If at step 473, it is determined that ActiveX is not available on this browser, then at step 478, it is checked whether mimetype video/quicktime is registered by a plugin. If not, the QTversion is set to no, and if so, then QTversion is set to yes at step 479. Then, at step 480, it is checked whether there is a plugin name containing "QuickTime Plug-in". If no, then the sub-routine is ended and detection results saved at step 482. If so, then QTversion is set to QuickTime Plug-in version, and the results are then saved at step 482, ending the process group illustrated at FIGS. 4B-4D.

Figure 5:
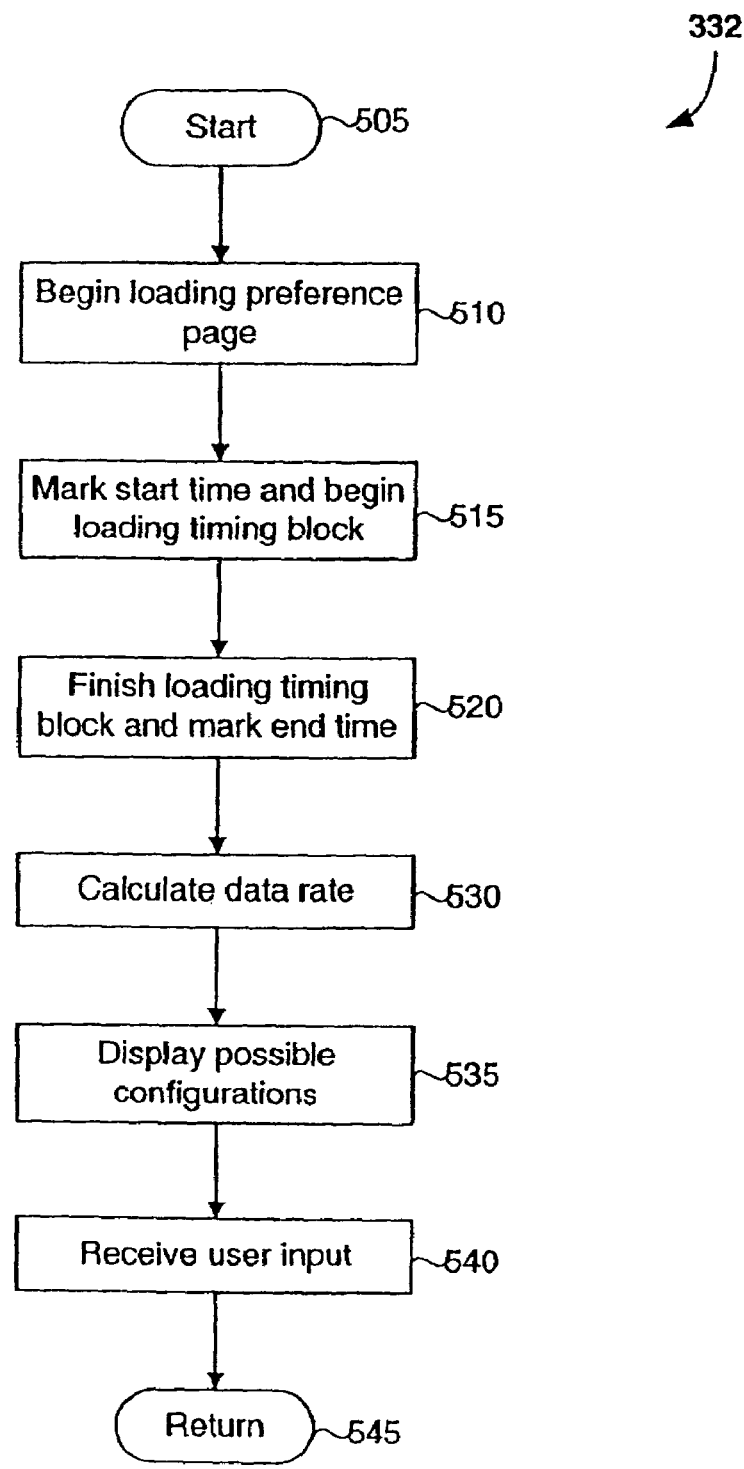
FIG. 5A is a flow chart illustrating the process of presenting a preferences page to the user, according to an embodiment of the invention.
FIG. 5B is a flow chart generally illustrating a bandwidth detection method according to an embodiment of the invention.

Referring to Step 355 of FIG. 3A, the step of presenting a preferences page to the user, is illustrated in greater detail in FIG. 5A according to an embodiment of the invention. The process begins at step 505. In step 510, the preferences page is loaded from the delivery management server. In step 515, the transfer of a block of data of known size, stored within the preferences page, begins. The transfer of this block is timed to determine the user's connection speed. This block is denoted hereinafter as a timing block. In an embodiment of the invention, the timing block is included in the preferences page as an HTML comment. As a result the browser ignores the timing block for processing purposes.

At the same time the transfer of the timing block begins, the browser notes the time at which the transferring of the timing block starts. In step 520, the transfer of the timing block concludes, and the time at which the transfer concludes is also noted by the browser. In step 530, a calculation is made as to the connection speed, i.e., data transfer rate, based on the time required to transfer the timing block and on its known size. In step 535, loading of the preferences page concludes and the possible configurations that the user might have are displayed for the user. In step 540, the user's input with regards to the configuration is received. The process concludes at step 545.

The preferences page can also be displayed at times other than what is described above with respect to FIG. 3A. In an embodiment of the invention, the user is given a link in the content provider's web page through which the user can access the preferences page whenever desired. This allows the user to change the stated preferences at will. In another embodiment of the invention, the preferences page is displayed to the user at regular intervals, e.g., every six months. This allows the user to make periodic updates of the configuration information.

With respect to the setting of cookies, when a browser makes a request to a server, the browser only sends up cookies that are associated with the server's domain. A cookie can be associated with a new domain in one of two ways:

1) a Set-Cookie: header is received from a server within the new domain, or 2) the cookie is set via javascript by a page that was loaded from a server in the new domain.

Since the player detection code is not always being run from a delivery management server page (e.g., the case where the player detection is loaded as part of the header of a content provider's web page), a way to set the cookies is needed. The goal is a third party cookie, whereby a cookie that would otherwise be set to the original domain (the content provider's domain) is set instead to the delivery management server's domain. In an embodiment of the invention, this can be done by making a dummy image( ) request from within javascript. Given a request that the image be loaded from the delivery management server's domain, the delivery management server can reply by sending back a Set-Cookie: header.

This can be applied in steps 330 and 334 above. For example, a URL may be built at the user's computer directed to a cookie set script at the delivery management server. Next, a dummy image object may be created at the user's computer. This object serves no purpose except to allow a dummy image request to be made, from within javascript, to the domain of the delivery management server. Then, the browser makes an HTTP request, asking that a dummy image be loaded from the domain of the delivery management server; this request incorporates a request for the cookie set script. The delivery management server responds by associating the cookies with the server (i.e., sending back a Set-Cookie: header). This will allow the cookies to be sent to the delivery management server, even though their presence at the user's computer may have originally been determined by the content provider or some other domain. The configuration information is stored in the cookies.

An example of such an exchange between a user and a delivery management server is illustrated below:

GET/ssp/cookieset?gmPlayerPref=real HTTP/1.1

Accept: image/gif, image/x-xbitmap, image/jpeg, image/pjpeg, application/vnd.ms-powerpoint, application/vnd.ms-excel, application/msword,*/*

Accept-Language: en-us

Accept-Encoding: gzip, deflate

User-Agent: Mozilla/4.0 (compatible; MSIE 5.5; Windows NT 5.0)

Host: js.genericmedia.net

Connection: Keep-Alive

Cookie:gmPlayers=v1% 2F % 2FQuickTime-4.12% 2F % 2FReal-6.0.7.788% 2F % 2FWM P-6.4% 2F % 2F;gmPlayerPref=wmf; gmBitratePref=300000

The server then responds:

HTTP/1.1 200 OK

Date: Tue, Jun. 12, 2001 20:08:29 GMT

Server: Apache/1.3.14 (Unix) mod_perl/1.24

Set-Cookie: gmPlayers=v1% 2F % 2FQuickTime-4.12% 2F % 2FReal-6.0.7.788% 2F % 2 FWMP-6.4% 2F % 2F;domain=.genericmedia.net; path=/;expires=Mon, Sep. 10, 2001 20:08:29 GMT

P3P: CP="IND OUR PRE UNI ONL COM"

Set-Cookie: gmPlayerPref-real; domain=.genericmedianet; path=/;expires=Mon, Sep. 10, 2001 20:08:29 GMT Connection: close Cache-Control: no-cache, max-age=1

Transfer-Encoding: chunked

Content-Type: text/html

Figure 5B:
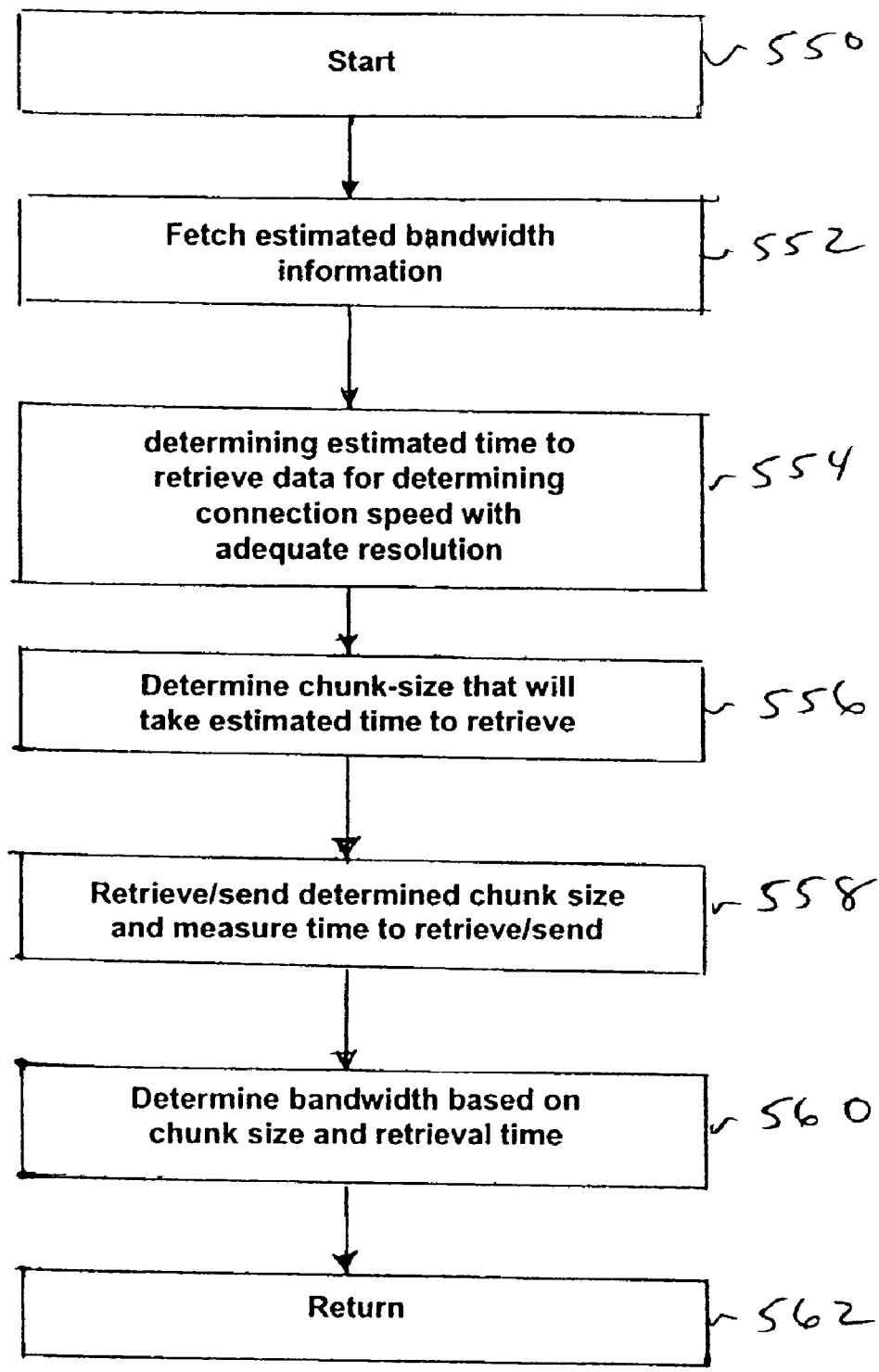

FIG. 5B is a flow chart generally illustrating a bandwidth detection method according to an embodiment of the invention. In this embodiment, a sub-routine is started at step 550 and proceeds at step 552 to fetch estimated bandwidth information, e.g., at determined from a previous bandwidth detection or otherwise. At step 554, an estimated time to retrieve data is determined for determining a connection speed with adequate resolution, i.e., using the estimated bandwidth information. Here, the reason for this is that we want the timing block or chunk-size to be selected based on the results of this step, and we want this estimated time to be not shorter than and not much longer than a minimum time within which bandwidth information may be determined within a tolerable resolution. For example, if the estimated time is too long for a client having a slow connection speed, then the bandwidth measurement will likely involve an annoying and unneeded delay for the user. However, if the estimated time is too short, e.g., for a client having a very fast connection speed, then the error in the determination will be too great or outside a tolerable margin of error.

Once that estimated time is determined, then the chunk-size or timing block size that will take the estimated time to communicate is determined at step 556. In accordance with a preferred embodiment, random data such as random ascii data is used in the timing block or chunk, so that modems will not compress the data and make the communication time drastically shorter than the estimated time and leaving the result outside the resolution tolerance.

Once the timing block size or chunk-size is determined that will take approximately the estimated time, then a timing block or data chunk of that determined size is communicated to the client at step 558. The actual time it takes to communicate the timing block is measured. The bandwidth is then determined at step 560 based on the size of the data chunk or timing block sent in step 558, and on the measured retrieval time by the client. The sub-routine illustrated at FIG. 5B is ended at step 562.

Accessing Media Content According to Embodiments

As described herein, systems and methods in accordance with preferred embodiments perform the transcoding of media content on demand, in response to a viewer's request to access media content. Additionally, preferred embodiments essentially perform the transcoding of media content in "real-time" after the publication of the media content, as part of the media content delivery process. In particular embodiments, the delay between the submission of a request to view media content to the media transcoding engine (see U.S. Pat. No. 6,407,680 and U.S. patent application Ser. No. 10/644,602, which are incorporated by reference) and the delivery of the media content to a viewer client will be approximately thirty seconds or less. However, the invention is not limited to a specific delivery time and can encompass a variety of delivery times greater than or less than thirty seconds.

Figure 6A:
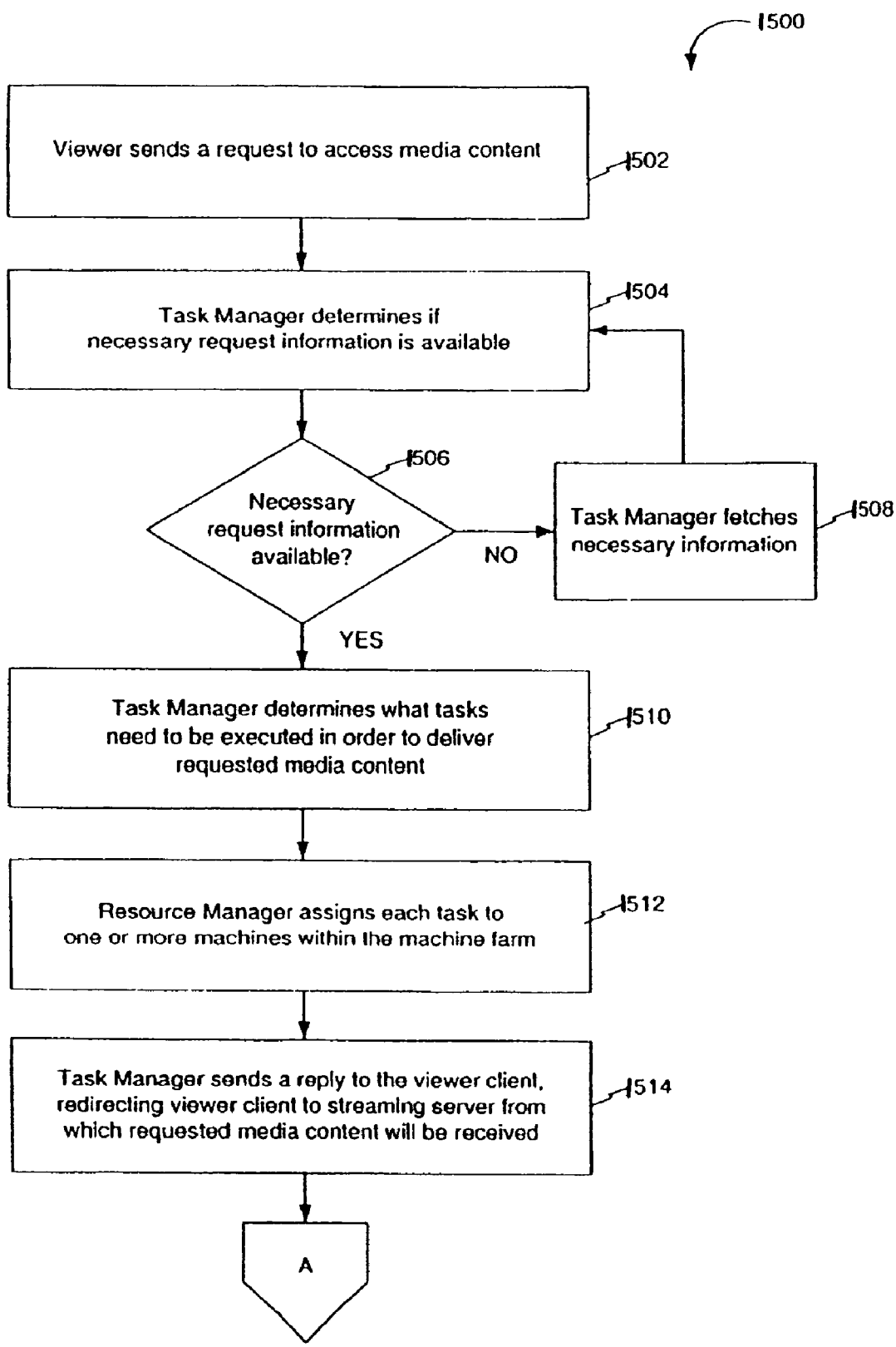
FIGS. 6A-6C are a flowchart that describes a routine for accessing media content according to an embodiment of the present invention.
Figure 6B:
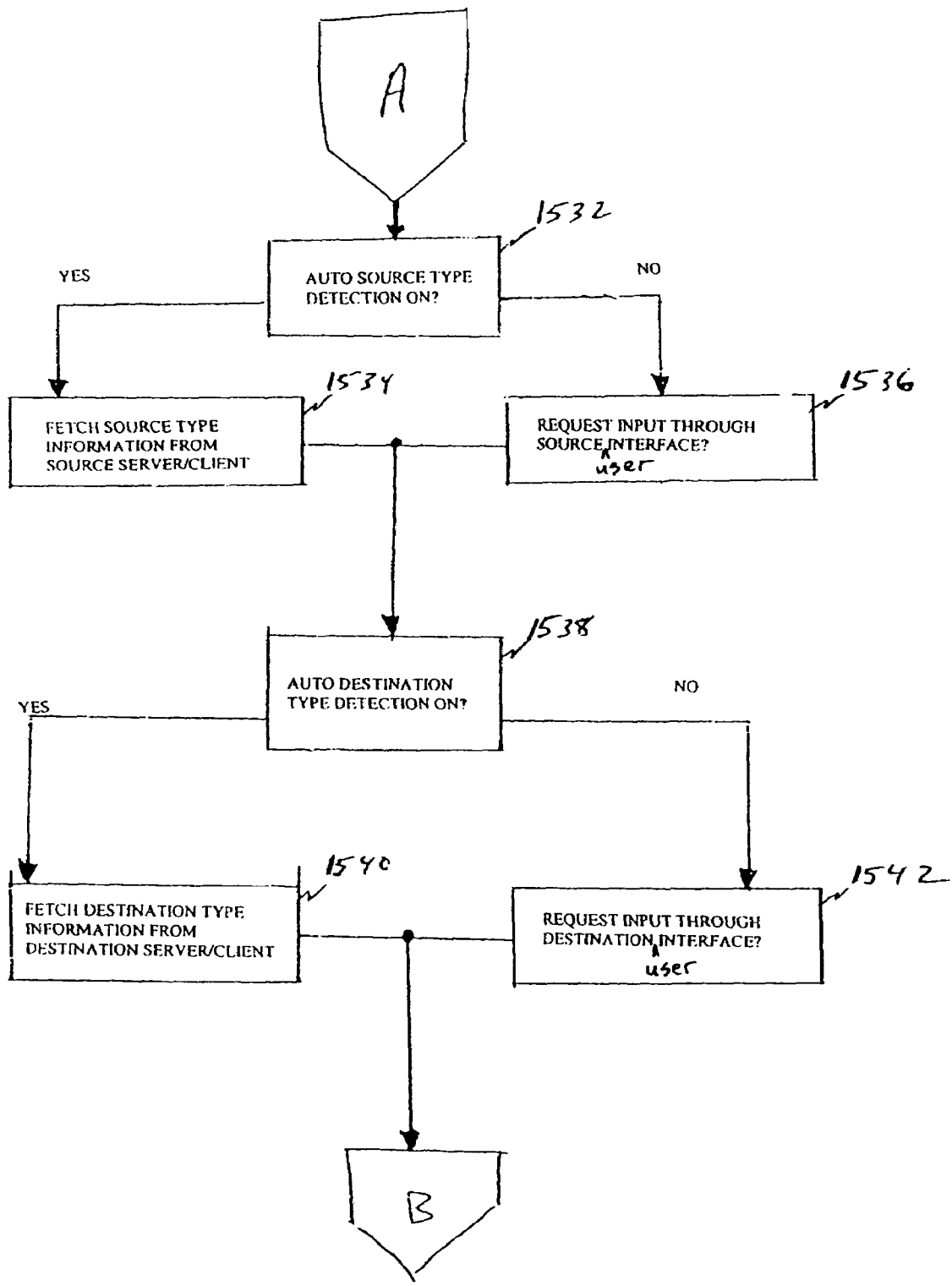
Figure 6C:
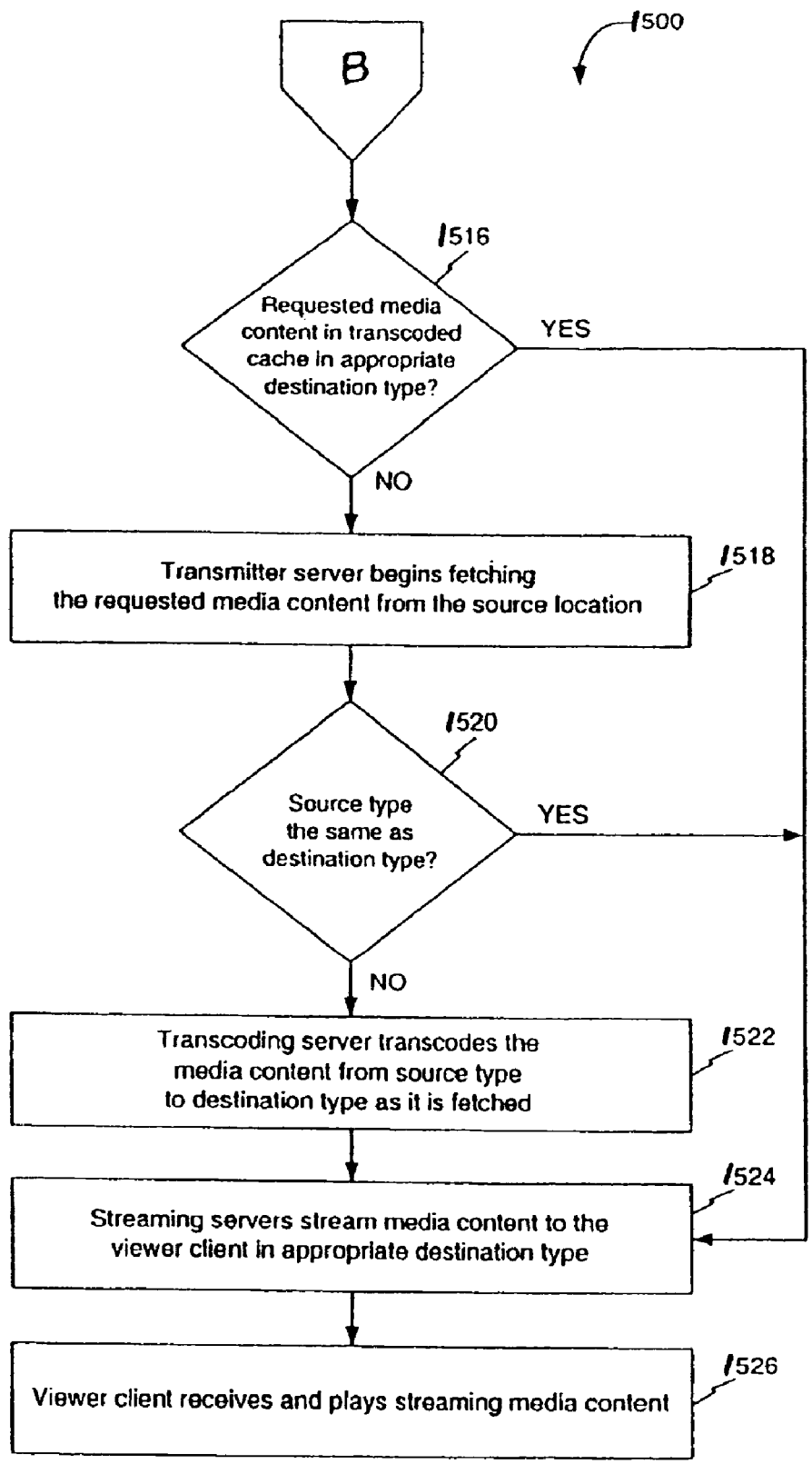

FIGS. 6A-6C depict a flowchart 1500 of a method by which media content is accessed by a viewer according to embodiments of the present invention. The invention, however, is not limited to the description provided by the flowchart 1500. Rather, it will be apparent to persons skilled in the art from the teachings herein that other functional flows are within the scope and the spirit of the present invention.

In step 1502 of FIG. 6A, the viewer sends a request to access media content via the viewer client to the viewer Web server interface within the media transcoding engine. In embodiments, the request is an HTTP request generated by the viewer client when the viewer clicks on a URL on the content provider's web-site. As discussed above, the URL link, which may be provided by the media transcoding engine to the content provider during the media content publishing process, contains address information and source information that points the viewer client to the media transcoding engine and provides information to the media transcoding engine about the source of the requested media content. After the viewer Web server interface receives the request, it forwards it to a task manager (again see U.S. Pat. No. 6,407,680 and application Ser. No. 10/644,602, incorporated by reference).

In step 1504, the task manager parses the request to determine if the necessary request information is included in order to service the request. In embodiments of the invention where the request comprises an HTTP request, the task manager parses the header of the HTTP request to determine if the necessary information is included in order to service the request. In embodiments, the necessary information includes at least a source location, a source type, a destination location, and a destination type. The source type and destination type are each defined by at least one publishing variable. In embodiments, publishing variables for media content can include, but are not limited to, the file format, bit rate, communication protocol(s), physical medium, compression algorithm, digital rights management information, or any combination thereof. In one embodiment, the information required for servicing the request includes at least a source location, a source format, a source bit-rate, a destination location, a destination format, and a destination bit rate.

If the task manager determines that the request information is not complete, the task manager will fetch the necessary information as shown in steps 1506 and 1508. For example, if the source type or source location is not included in the request and the requested media content is stored within the media transcoding engine, the task manager can consult a database to find the necessary source information. Alternately, if the media content is stored externally with respect to the media transcoding engine, the task manager can perform a network request to fetch the necessary information from the content provider's web-site. For example, the task manager can perform an HTTP request, an RTSP request, or a request using any other standard network application protocol. Additionally, if the destination type is not available, the task manager can fetch the needed information by querying the viewer client. As discussed above, in embodiments, the optimal destination type for the destination location may be stored as a "cookie" on the viewer client, which may be accessed by the task manager.

At step 1510, once the task manager has the necessary information to service the request, it then determines what tasks need to be executed in order to deliver the requested media content. The tasks include all the steps necessary to deliver the requested media content, and may include fetching the requested media content, transcoding the requested media content from the source type into the destination type, and streaming the transcoded media content to the viewer client. Once the task manager has determined what tasks need to be executed, it then interfaces with a resource manager (again see U.S. Pat. No. 6,407,680 and application Ser. No. 10/644,602, incorporated by reference) and instructs the resource manager to execute the required tasks.

The resource manager receives the instruction to execute the required tasks from the task manager and, at step 1512, assigns each task to one or more machines within the machine farm. The resource manager is programmed to achieve an efficient execution of tasks by the available resources. In embodiments, the allocation of resources to a given task by the resource manager is determined based on a variety of factors including, but not limited to, which machines support the necessary utilities for performing the required task, which machines have available resources (for example, available CPU), and which machines can coordinate with each other to carry out the task when coordination is required for execution. The resource manager can also be programmed to distribute tasks based on a variety of other criteria including the avoidance of network congestion. For example, the resource manager may be programmed to assign decompression and compression tasks to the same machine in order to avoid the network congestion that may result from transmitting uncompressed data from one machine to another within the internal network of the media transcoding engine.

In accordance with a preferred embodiment, the resource manager oversees tasks after they are assigned to make sure that they are properly executed. The resource manager oversees the execution of assigned tasks by maintaining a list of all assigned tasks in the database and periodically communicating with the slave monitor of each machine running a given task in order to determine the status of the task.

In embodiments, the resource manager periodically polls the slave monitor of the machine to which the task has been assigned to determine the status of the task. In alternate embodiments, the slave monitor itself sends periodic status messages to the resource manager, informing it of the status of an assigned task. The resource manager stores information that it receives from the slave monitors about the status of each task and each machine in the database in order to assist in its function of assigning and monitoring necessary tasks.

In an alternate embodiment, the slave monitors only initiate tasks received from the resource manager, and the tasks themselves report directly to the resource manager rather than to the slave monitors.

The resource manager monitors each assigned task in accordance with a fault tolerance routine that permits the resource manager to determine when a task has failed and to execute the necessary steps for correcting the problem and ensuring the delivery of the requested media content. For example, if a machine to which a task has been assigned does not respond to a status query for a predetermined period of time, the resource manager can be programmed to reassign the task to a different machine and re-boot the machine that is not responding. Additionally, where the failure of a task also results in the failure of a chain of distributed dependent tasks, the resource manager can be programmed to shut down all the dependent tasks and re-assign the entire set of tasks in order to ensure the delivery of the requested media content. These examples are not limiting, and other fault tolerance schemes will be apparent to one of ordinary skill in the relevant art based on the teachings contained herein, and the invention is directed to such other fault tolerance schemes.

In a further embodiment, individual tasks are each assigned a priority. The resource manager monitors new tasks and when the priority of an existing task is lower than that of a new task that needs to be assigned, the resource manager will instruct the existing task to kill itself to accommodate the new higher-priority task. Alternately, the slave monitor can kill the existing task. An example of a low priority task includes the transcoding of media content for a viewer after the viewer has stopped viewing the requested content.

At step 1514, after all the tasks have been assigned, the task manager constructs a reply to the initial request to access media content received from the viewer client. The reply serves to redirect the viewer client to a streaming server or proxy server from which the requested media content will ultimately be received by the viewer client. In embodiments, the reply comprises an HTTP reply.

At step 1532, a determination is made whether auto source type detection in accordance with a preferred embodiment is turned on. The system may be permanently set to automatic source type detection on or to automatic source type detection off or it may be selectively toggled. If the automatic source type detection is permanently on or off, then the determination is not necessary and the method can move to the corresponding step 1534 or 1536. In the method illustrated at FIG. 6B, after the determination is made, then the method move to the next corresponding step. That is, if automatic source type detection is turned on, then at step 1534, source type information is automatically fetched from source server or client. An advantage is that this is quicker and simpler for the user. Alternatively, if automatic source type detection is turned off, then at step 1536, input is requested through a source user interface from a user who is demanding the content. An advantage is that a user with multiple source types for the content can choose between them, or if the source has a firewall such that the source type cannot be readily detected with user input.

At step 1538, a determination is made whether auto destination type detection in accordance with a preferred embodiment is turned on. The system may be permanently set to automatic destination type detection on or to automatic destination type detection off or it may be selectively toggled. If the automatic destination type detection is permanently on or off, then the determination is not necessary and the method can move to the corresponding step 1540 or 1542. In the method illustrated at FIG. 6B, after the determination is made, then the method move to the next corresponding step. That is, if automatic destination type detection is turned on, then at step 1540, destination type information is automatically fetched from destination server or client. An advantage is that this is quicker and simpler for the user. Alternatively, if automatic destination type detection is turned off, then at step 1542, input is requested through a destination user interface from a user who is demanding the content. An advantage is that a user with multiple destination types for the content can choose between them, or if the destination has a firewall such that the destination type cannot be readily detected with user input.

Further criteria independent of destination type may be detected and applied based upon designated rules, e.g., as set out by the publisher of the media content or otherwise based upon a business rule. For example, bandwidth criteria may be based upon a customer's contract, or a trailer or a clip or both may be inserted with the transcoded media content upon request by a publisher.

At steps 1516-1526 of FIG. 6C, the machines within the machine farm perform the steps necessary to deliver the requested media content in accordance with the assigned tasks received from the resource manager. In embodiments of the present invention, the delivery of media content is a pipelined process in which the fetching, transcoding and streaming of different portions of the same media content stream may occur simultaneously. The resource manager arranges for the pipelining of these steps through resource allocation within the media transcoding engine. The pipelining of these steps results in a faster delivery time for requested media by the media transcoding engine.

As shown at step 1516, if the requested media content already resides in a transcoded cache transcoded into the appropriate destination type (e.g., the appropriate destination format and bit-rate or other appropriate publishing variables), then the delivery of content is achieved by streaming servers at step 1524, which stream the transcoded media content to the viewer client.

If, however, the requested media content does not reside in the transcoded cache transcoded into the appropriate destination type, then one or more transmitter servers within the machine farm begins fetching the requested media content as a data stream from the source location as shown at step 1518. As discussed above in regard to FIGS. 3A-3B and 4A-4D, in embodiments of the invention, the requested media content can initially either reside within a master archive within the media transcoding engine, in an archive external to the media transcoding engine, or be received as a streaming feed directly from the content provider client. Where the requested media content resides within the master archive, one of the transmitter servers fetches the requested media content over the internal network of the media transcoding engine.

Where the requested media content resides in an archive outside of the media transcoding engine, one of the transmitter servers uses the access information provided during the publishing process to fetch the requested media content. In embodiments, after the transmitter server uses the access information to fetch the requested media content, the requested media content may be temporarily cached in the master archive, permitting expedited access to the media content when subsequent requests for the same media content are received by the media transcoding engine.

Where the requested media content is a streaming feed directly from the content provider client, one of the transmitter servers fetches the streaming data from the content provider Web server interface. Because embodiments of the present invention do not fetch and transcode the streaming data until it is actually requested by a viewer, unnecessary transcoding of media content is thereby avoided.

As shown in step 1520, after the transmitter server begins fetching the requested media content, if the source type is the same as the destination type (e.g., the source format and bit rate is the same as the destination format and bit-rate), then no transcoding is necessary and the media content is transmitted to the streaming servers as soon it is fetched. The streaming servers then stream the content to the viewer client at step 1524, as described below. However, if the source type is not the same as the destination type, then one of the transcoding servers within the machine farm will transcode the media content from the source type to the destination type as shown in step 1522. In accordance with the discussion in regard to step 1512, above, the resource manager assigns the transcoding task to a transcoder server that runs the necessary transcoder software for performing the appropriate conversion of publishing variables. In embodiments, the transcoding is carried out using one of a variety of well-known methods and for converting media content of one type to another, including conventional codec routines for transcoding media content. Further description of transcoding operation and examples are provided below. In embodiments, after the transcoding is complete, a copy of the transcoded media content is temporarily stored in the transcoded cache, permitting expedited delivery of the media content when subsequent requests for the same media content transcoded into the same destination type are received by the media transcoding engine.

In step 1524, one of the streaming servers streams the media content in the appropriate destination type to the viewer client as soon as it is received from either a transcoder, a transmitter or the transcoded cache. In embodiments, the transcoded media content is streamed to the viewer client via an optional proxy server. In further embodiments, either the streaming server or the optional proxy server keep usage statistics pertaining to the media content being delivered as well as the destination types in which the media content is being delivered that are used by the resource manager for cache management purposes.

In embodiments, the protocol used for streaming media to the viewer client and for streaming data between the transmitter servers, transcoder servers and the streaming servers is a standard protocol for streaming media, such as RTSP. Alternately, a proprietary protocol defined over standard network protocols like TCP/UDP can be used. In further embodiments, different protocols may be used to accommodate different network infrastructure needs. For example, protocols may be implemented that dynamically change according to network traffic conditions. However, these examples are illustrative. The present invention is not intended to be limited to a specific communication protocol or application, and other proprietary or non-proprietary network communication protocols and applications can be used.

At step 1526, the viewer client receives the streaming media content from either the streaming server or the proxy server. At this point, the viewer client plays the media content in accordance with the destination type associated with the media player resident on the viewer client. In alternate embodiments of the present invention, the media content may be received and stored as a downloaded file on the viewer client for playing at a later time, or for transfer to an alternate media playing device. After step 1526, the flowchart 1500 ends.

Media Content Examples

As described in U.S. Pat. No. 6,407,680, e.g., a media transcoding engine may include one or more transcoders. Transcoders convert certain types of media content (referred to herein as a source type) to another type of media content (referred to herein as a destination type). Transcoding can involve a number of different conversion operations. The particular conversion operations used depend upon the media content and associated publishing variables being converted. This is why the efficient detection of the configuration information of a client, which may be a destination, is advantageous. Publishing variables as used herein refer to different characteristics of media content.

According to a preferred embodiment, media content is digital data being published over a network. In this case, publication refers to digital data which has been formatted for delivery over a network and for viewing by a destination media player. Publishing variables for media content can include, but are not limited to, the file format, bit rate, communication protocol(s), physical medium, compression algorithm, and/or digital rights management information.

The digital data can be any type of file format including but not limited to container formats, bitmap formats, video formats, audio formats, vector formats, metafile formats, scene formats, animation formats, multimedia formats, hybrid formats, hypertext and hypermedia formats, three-dimensional data (3D) formats, virtual reality modeling language (VRML) formats, font formats (bitmap fonts, stroke fonts, spline-based outline fonts), page description language (PDL) formats, and any other type of graphics file format or other file format. Table 1 lists examples of such file formats that can be used in embodiments of the present invention:

TABLE 1

Example File Formats

| Format | Type |
|---|---|
| ADOBE ILLUSTRATOR | Metafile |
| ADOBE PHOTOSHOP | Bitmap |
| ATARI ST GRAPHICS FORMATS | Bitmap and Animation |
| AUTOCAD DXF | Vector |
| AUTODESK 3D STUDIO | Scene Description |
| BDF | Bitmap |
| BRL-CAD | Other |
| BUFR | Other |
| CALS RASTER | Bitmap |
| CGM | Metafile |
| CMU FORMATS | Multimedia |
| DKB | Scene Description |
| DORE RASTER FILE FORMAT | Bitmap |
| DPX | Bitmap |
| DR. HALO | Bitmap |
| DVM MOVIE | Animation |
| ENCAPSULATED POSTSCRIPT | Metafile (page description language) |
| FACESAVER | Bitmap |
| FAX FORMATS | Bitmap |
| FITS | Other |
| FLI | Animation |
| GEM RASTER | Bitmap |
| GEM VDI | Metafile |
| GIF | Bitmap |
| GRASP | Animation |
| GRIB | Other |
| HARVARD GRAPHICS | Metafile |
| HIERARCHICAL DATA FORMAT | Metafile |
| IFF | Bitmap |
| IGES | Other |
| INSET PIX | Bitmap |
| INTEL DVI | Multimedia |
| JPEG FILE INTERCHANGE FORMAT | Bitmap |
| KODAK PHOTO CD | Bitmap |
| KODAK YCC | Bitmap |
| LOTUS DIF | Vector |
| LOTUS PIC | Vector |
| LUMENA PAINT | Bitmap |
| MACINTOSH PAINT | Bitmap |
| MACINTOSH PICT | Metafile |
| MICROSOFT PAINT | Bitmap |
| MICROSOFT RIFF | Multimedia |
| MICROSOFT RTF | Metafile |
| MICROSOFT SYLK | Vector |
| MICROSOFT WINDOWS BITMAP | Bitmap |
| MICROSOFT WINDOWS METAFILE | Metafile |
| MIFF | Bitmap |
| MPEG | Other |
| MTV | Scene Description |
| NAPLPS | Metafile |
| NFF | Scene Description |
| OFF | Scene Description |
| OS/2 BITMAP | Bitmap |
| P3D | Scene Description |
| PBM., PGM., PNM., and PPM. | Bitmap |
| PCX | Bitmap |
| PDS | Other |
| PICTOR PC PAINT | Bitmap |
| PIXAR RIB | Scene Description |
| PLOT-10 | Vector |
| PNG | Bitmap |
| POV | Vector |
| PRESENTATION MANAGER METAFILE | Metafile |
| PRT | Scene Description |
| QRT | Scene Description |
| QUICK TIME | Other |
| RADIANCE | Scene Description |
| RAYSHADE | Scene Description |
| RIX | Bitmap |
| RTRACE | Scene Description |
| SAF | Bitmap and other |
| SENSE8 NFF | Scene Description |
| SGI IMAGE FILE FORMAT | Bitmap |
| SGI INVENTOR | Scene Description |
| SGI YAODL | Scene Description |
| SGO | Vector |
| SPIFF | Bitmap |
| SUN ICON | Bitmap |
| SUN RASTER | Bitmap |
| TDDD | Vector and Animation |
| TGA | Bitmap |
| TIFF | Bitmap |
| TTDDD | Vector and Animation |
| URAY | Scene Description |
| UTAH RLE | Bitmap |
| VICAR2 | Bitmap |
| VIFF | Bitmap |
| VIS-5D | Vector |
| VIVID AND BOB | Scene Description |
| WAVEFRONT OBJ | Vector |
| WAVEFRONT RLA | Bitmap |
| WORDPERFECT GRAPHICS METAFILE | Metafile |
| XBM | Bitmap |
| XPM | Bitmap |
| XWD | Bitmap |
| ZBR | Metafile |

See, Murray and vanRyper, pp. 12-26. These examples are illustrative and not intended to limit the present invention. Other file formats (now known or developed in the future) can be used as would be apparent to a person skilled in the art given this description.

Even within the same file format, digital data can be compressed according to different compression algorithms. In a QUICK TIME formatted file, for example, video can be compressed in accordance with H.263, CINEPAK, JPEG, QT ANIMATION, or QT VIDEO standards. As a further example, in a WINDOWS MEDIA ASF formatted file, audio can be compressed in accordance with the MICROSOFT AUDIO FORMAT, ACELP, VOXWARE, or MP3 standards. Compression algorithm choices can be made based on optimization according to bit-rate choices, or according to the nature of the content. For example, video files in which little motion occurs ("talking heads") and video files in which there is a substantial amount of motion ("high-motion" video) may each be more efficiently compressed using different compression algorithms.

Within any one compression algorithm, there can be further variations. For example, files compressed according to the JPEG standard can be either YUV-based or RGB-based.

With respect to the digital rights management system of the preferred embodiment, a media player on a client computer detected in accordance with an aspect of the invention determines the DRM information type, or usage rule type, which it can handle. For example, Windows Media Player can interpret and/or handle usage rules provided by Microsoft Windows Media DRM system, but generally cannot interpret and/or handle those provided by Real's Helix DRM system. Moreover, Reane player can interpret and/or handle those provided by Real's Helix DRM system, but cannot interpret and/or handle those provided by Microsoft Windows Media DRM system. That is, a media player type generally has a one-to-one correspondence to DRM type that it can interpret.

In addition, DRM information or usage rule information may be described by XrML, XML or the like including tags and their values. DRM information or usage rule information may also be attached to content. Otherwise, it may be separated physically from content and is associated logically to content through content ID or the like. DRM information or usage rule information may also define how and/or when a user can use the associated content.

In accordance with an aspect of this invention, the server system can automatically detect media player type on a client computer, determine a DRM type on the client computer based on media player type, and automatically transcode DRM information or usage rule information to be able to interpret and/or handle it on the client computer. As described at U.S. Pat. No. 6,407,680, DRM information may be transcoded from source type (e.g., MSFT Windows Media DRM) to destination type (e.g., Real Helix).

According to this aspect of the invention, then, a method for remotely determining the configuration of a computer of a multimedia content user is provided. The advantageous method includes sending player detection code to the user's computer, receiving configuration information regarding the user's computer, and determining a type of digital rights management information on the user's computer based on the received configuration information.

In addition to the publishing variables set forth above, there are also publishing variables unique to video data and audio data. Publishing variables for video data include the width and height of the video image in pixels as well as the frame rate of the video. Depending on the bit-rate requirements and the nature of the data, different settings may be necessary in order to ensure the best picture quality. For example, some video may be better viewed at 15 frames per second at 160×120 pixels, while some others may be better viewed at 5 frames per second at 320×240 pixels, even at the same bit-rate. Where the bit-rate is 56K bps, picture quality becomes very limited, and it is almost never optimal to deliver video in 640×480 pixel resolution. Yet another publishing variable for video data is the number of bits per component.

Publishing variables for audio data include the number of samples per second, the number of channels (e.g., mono, stereo, 5-channel) and the sample size (8-bit, 16-bit, etc.). Different settings may be necessary to ensure audio quality in light of a particular content type and bit-rate. Publishing variables may also include the size of data packets being sent and the choice of transmission protocol (e.g., TCP vs. UDP).

Figure 7:
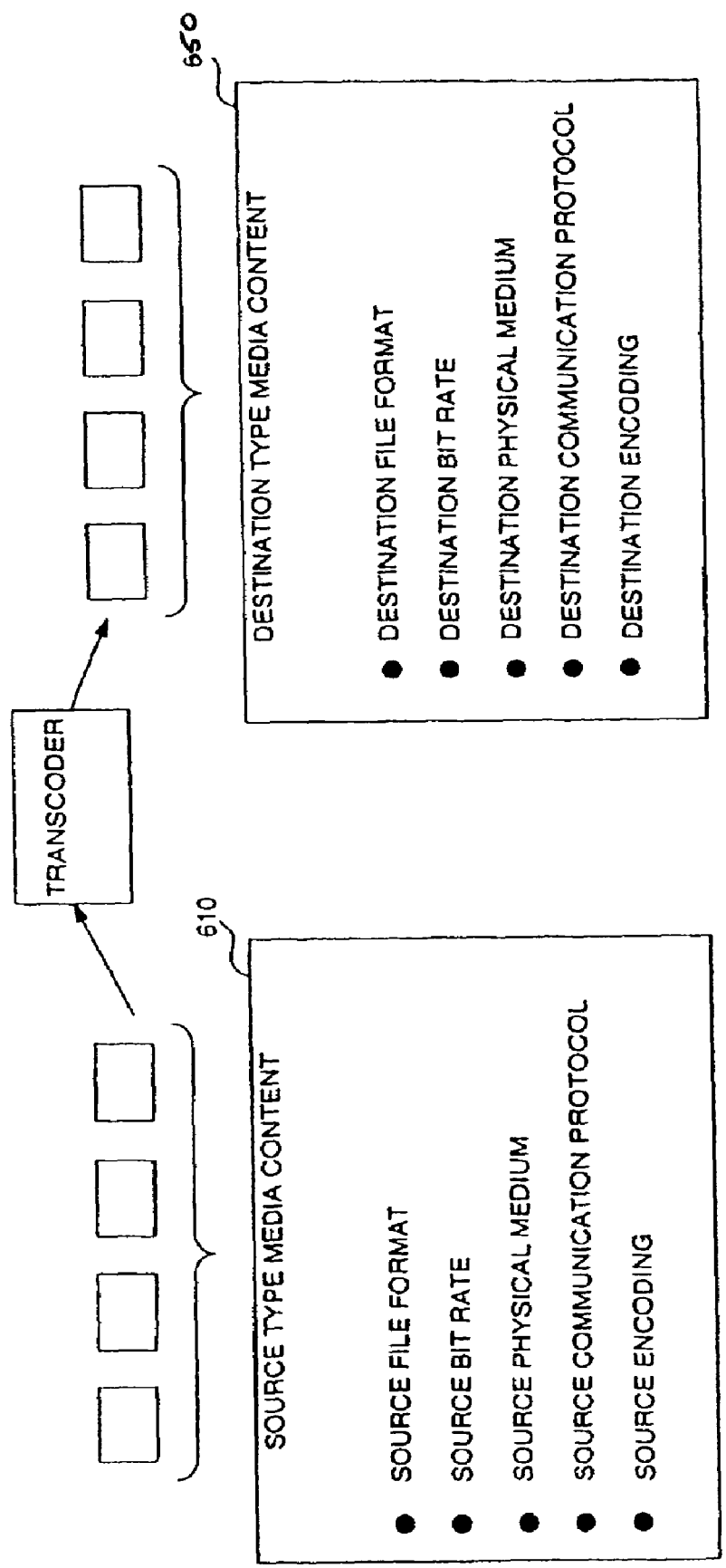
FIG. 7 depicts an exemplary transcoder that may be used in accordance with embodiments of the present invention.

FIG. 7 shows an example transcoder that transcodes on demand source type media content 610 to destination type media content 650. Source type media content 610 is digital data delivered over a network in one or more packets. The digital data that forms source type media content 610 is defined by one or more publishing variables. The publishing variables as shown in FIG. 7 include one or more of the following variables: source file format, source bit rate, source physical medium, source communication protocol, source encoding, or any combination thereof. Destination type media content 650 is digital data delivered over a network in one or more packets to an end user that demands the media content. The digital data that forms destination type media content 650 is also defined by one or more publishing variables. The publishing variables as shown in FIG. 7 include one or more of the following variables: destination file format, destination bit rate, destination physical medium, destination communication protocol, destination encoding, or any combination thereof.

FIG. 8 shows a table of an example implementation where one or more transcoders transcodes on demand from a source type media content 710 to a first destination type 750. FIG. 8 also shows an example implementation where one or more transcoders transcodes on demand from a source type media content 710 to a second destination type 760. The source type media content 710 includes digital data published according to the following source publishing variables: namely, the physical medium is a local disk, the communication protocol includes a file I/O, the file format is MP3 using MP3 encoding at a bit rate of 128 kilobits per second (kbps). The first destination type media content 750 includes digital data transcoded for publication according to the following destination publishing variables: namely, the physical medium is a packet-switched network (the Internet), the communication protocol includes WINDOWS MEDIA STREAMING MMS protocol, the file format is WINDOWS MEDIA FILE, using MP3 encoding at a bit rate of 56 kbps. The second destination type media content 760 includes digital data transcoded for publication according to the following destination publishing variables: namely, the physical medium is a Wireless Network, the communication protocol includes HTTP, the file format is MP3 including MP3 encoding at a bit rate of 12 kbps.

Other examples are shown in the following tables:

TABLES 2-5

Example Transcoder Operations

TABLE 2

| Publishing Variables | Source Type | Destination Type |
| --- | --- | --- |
| physical medium | Disk | Network |
| communication protocol(s) | File I/O | RTSP |
| container format | MPEG1 | QUICK TIME |
| encoding | MPEG1 | SORENSON (video) QDESIGN (audio) |
| bit rate | 1.5 Mbps | 300 kbps |

TABLE 3

| Publishing Variables | Source Type | Destination Type |
| --- | --- | --- |
| physical medium | Wired Network | Wireless Network |
| communication protocol(s) | HTTP | MMS |
| container format | MPEG1 | WINDOWS MEDIA |
| encoding | MPEG1 | MPEG4 (video) MSAUDIO (audio) |
| bit rate | 1.5 Mbps | 100 kbps |

TABLE 4

| Publishing Variables | Source Type | Destination Type |
| --- | --- | --- |
| physical medium | Wired Network | Wired Network |
| communication protocol(s) | HTTP | RTSP |
| container format | QUICK TIME | REAL |
| encoding | H.263 | REAL PROPRIETARY G2 Video/Audio |
| bit rate | 56 kbps | 56 kbps |

TABLE 5

| Publishing Variables | Source Type | Destination Type |
|---|---|---|
| physical medium | Disk | Wireless Network |
| communication protocol(s) | File I/O | HTTP |
| container format | MPEG1 | MP3 |
| encoding | MPEG1 | audio only - MP3 |
| bit rate | 1.5 Mbps | 16 kbps |

FIG. 9 is a table showing exemplary client environment variable types according to an embodiment of the invention. The system of the preferred embodiment is capable of determining further characteristics of client systems including operation system (OS) versions, web browser versions, hardware platforms and user interface languages. This capability is an advantageous improvement even over a system that includes the advantageous ability to discern which type of OS, e.g., Windows, Mac or Linux, is being used on the client machine. For example, even if it is known the system uses Windows, an assumption of a version more recent than the client actually has could result in complete failure of the media stream and a conservative assumption of a much earlier version can result in inefficiencies.

An example is provided of a source type 810, i.e., where the media content is coming from and configured for initially, having Window XP as its OS version, Navigator 3.0 as its browser version, a Pentium 4 processing chip installed and using Javascript for Navigator 3.0 as its user interface language. These source types may be provided or determined similar to the determination of the client configuration described in accordance with an embodiment herein. Then, the destination types 850 are illustrated as being Mac OS X operating system, Omniweb 4.1 web browser version, a G3 processor chip, and user interface language XSLT for Omniweb 4.1. Once the destination types 850 are remotely determined according to an embodiment herein, and the source types 810 are also determined, then an advantageous transcoding process such as may preferably be described at U.S. patent application Ser. No. 10/644,602, incorporated herein by reference, may be used to stream the media content provided from the source to the destination, notwithstanding the different types of hardware and software being used.

These examples are illustrative and not intended to limit the present invention. Other types of on demand transcoding operations that are known now or developed in the future can be used as would be apparent to a person skilled in the art given this description.

ALTERNATE EMBODIMENTS

Example embodiments of the methods and systems of the present invention have been described herein. As noted elsewhere, these example embodiments have been described for illustrative purposes only, and are not limiting. Alternate embodiments, differing slightly or substantially from those described herein, will be apparent to persons skilled in the relevant art based on the teachings contained herein. For example, one skilled in the relevant art will appreciate that the transcoding system and method of the present invention is not limited to the transcoding and delivery of media content alone, but also encompasses the transcoding and delivery of information of all types, including, but not limited to compressed files, electronic documents, HTML pages, XML documents, and any other information that can be stored in a plurality of formats and delivered electronically. Other alternate embodiments include, but are not limited to, hardware, software, and software/hardware implementations of the methods, systems, and components of the invention. Such alternate embodiments fall within the scope and spirit of the present invention.

Also, systems and methods for the on-demand transcoding of media content from a source type to a destination type may be provided, wherein the system includes a plurality of transcoders for transcoding from a plurality of source types to a plurality of destination types, and wherein the system receives a transcoding request for media content, fetches the media content in response to the transcoding request, sends the media content to one of the plurality of transcoders based on the source type and destination type, transcodes the media content from the source type to the destination type, thereby generating transcoded media content, and transmits the transcoded media content. The system may fetch, send, and transcode the media content and transmit the transcoded media content in a pipelined fashion. The system may also provide for the publication of media content as a file or stream of digital data, for the archiving of media content, and the caching of transcoded media content to improve system efficiency.

In addition, in methods that may be performed according to preferred embodiments herein and that may have been described above, the operations have been described in selected typographical sequences. However, the sequences have been selected and so ordered for typographical convenience and are not intended to imply any particular order for performing the operations.

What is claimed is:

1. A method for remotely determining a configuration of a computer of a multimedia content user, comprising:
   sending player detection code to the user's computer;
   receiving configuration information regarding the user's computer; and
   sending a modified information header instruction to the user's computer,
      wherein the detection code fetches estimated data corresponding to the configuration of the user's computer via a sub-routine which determines an optimal timing block for a bandwidth measurement.

2. The method of claim 1, wherein the received configuration information includes one or more adaptations.

3. The method of claim 2, wherein the one or more adaptations comprise a hardware adaptation.

4. The method of claim 2, wherein the one or more adaptations comprise a user interface version adaptation.

5. The method of claim 2, wherein the modified header information instruction is prepared according to the adaptation information.

6. The method of claim 1 further comprising sending a unique client ID.

7. The method of claim 1 further comprising:
   instruction receiving occurring after the sending of the modified information header instruction, and
   the modified information including some information that was not included in the sent information.

8. The method of claim 1 further comprising:
   instruction receiving occurring after the sending of the modified information header instruction, and
   the modified information excluding some information that was included in the sent information.

9. The method of claim 1 further comprising:

the modified information header instruction being sent prior to the receiving, and the configuration information received being prepared according to the modified information header instruction.

10. A computer-readable medium adapted to store program code for programming one or more processors to perform a method for remotely determining a configuration of a computer of a multimedia content user, the method comprising:

sending player detection code to the user's computer;

receiving configuration information regarding the user's computer; and sending a modified information header instruction to the user's computer, wherein the detection code fetches estimated data corresponding to the configuration of the user's computer via a sub-routine which determines an optimal timing block for a bandwidth measurement.

11. The method of claim 10 further comprising:

the received configuration information including one or more adaptations.

12. The method of claim 11, wherein the one or more adaptations comprises a hardware adaptation.

13. The one or more storage devices method of claim 11, wherein the one or more adaptations comprises a user interface version adaptation.

14. The method of claim 11, wherein the modified header information instruction is prepared according to the adaptation information.

15. The method of claim 10, further comprising sending a unique client ID.

16. The method of claim 10 further comprising:

instruction receiving occurring after the sending of the modified information header instruction, and the modified information including some information that was not included in the sent information.

17. The method of claim 10 further comprising:

instruction receiving occurring after the sending of the modified information header instruction, and the modified information excluding some information that was included in the sent information.

18. The method of claim 10 further comprising:

the modified information header instruction being sent prior to the receiving, and the configuration information received being prepared according to the modified information header instruction.

* * * * *